US012006104B2

(12) United States Patent
Sakakibara et al.

(10) Patent No.: US 12,006,104 B2
(45) Date of Patent: Jun. 11, 2024

(54) DOUBLE OPENING STORAGE DEVICE

(71) Applicant: TOYODA GOSEI CO., LTD., Kiyosu (JP)

(72) Inventors: Masanori Sakakibara, Kiyosu (JP); Nobuhiro Terai, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 168 days.

(21) Appl. No.: 17/690,759

(22) Filed: Mar. 9, 2022

(65) Prior Publication Data
US 2022/0306008 A1    Sep. 29, 2022

(30) Foreign Application Priority Data

Mar. 29, 2021 (JP) ................................. 2021-056302
Mar. 31, 2021 (JP) ................................. 2021-060177

(51) Int. Cl.
*B60R 7/04* (2006.01)
*B65D 43/16* (2006.01)
(Continued)

(52) U.S. Cl.
CPC ................ *B65D 43/16* (2013.01); *B60R 7/04* (2013.01); *E05D 15/502* (2013.01); *B60N 2/793* (2018.02); *E05C 21/005* (2013.01)

(58) Field of Classification Search
CPC ......... B65D 43/16; B60R 7/04; B60R 16/037; E05D 15/502; E05D 15/50; E05D 3/06;
(Continued)

(56) References Cited

U.S. PATENT DOCUMENTS 7,931,322 B2 *   4/2011   O'Brien ................. B60N 2/793
                                                        296/37.8
8,278,602 B2    10/2012   Yoneyama et al.
(Continued)

FOREIGN PATENT DOCUMENTS

DE   102010063707 A1 *  6/2012  ............. E05B 77/06
DE   102017103591 A1 *  8/2018  ............... B60R 7/04
(Continued)

OTHER PUBLICATIONS

The Notification of Reasons for Refusal mailed Oct. 31, 2023 issued in corresponding Japanese Application No. 2021-060177 (and English machine translation).

*Primary Examiner* — Pinel E Romain
(74) *Attorney, Agent, or Firm* — Posz Law Group, PLC

(57) ABSTRACT

A double opening storage device includes: a box body; a lid member; an open/close mechanism for opening/closing the lid member around a first or second rotation shaft; and an actuation device provided at the lid member and receiving power from the box body side via a wiring member. The open/close mechanism has a hinge member having one end supported swingably around the first rotation shaft by the lid member and another end supported swingably around the second rotation shaft by the box body. In opening/closing the lid member around the first rotation shaft, the hinge member stays at the box body without following the lid member, and in opening/closing the lid member around the second rotation shaft, the hinge member swings from the box body, following the lid member. The wiring member has a hinge wiring portion extending and wired along the hinge member between the one and other ends.

15 Claims, 14 Drawing Sheets

(51) Int. Cl.
  *E05D 15/50*   (2006.01)
  *B60N 2/75*    (2018.01)
  *E05C 21/00*   (2006.01)

(58) Field of Classification Search
  CPC ....... E05D 11/10; B60N 2/793; E05C 21/005;
         E05Y 2900/538; E05B 83/32; H05B 3/02
  USPC .............. 296/37.8, 153, 24.34, 24.43, 24.46;
                              220/483
  See application file for complete search history.

(56)                References Cited

U.S. PATENT DOCUMENTS

| | | | |
|---|---|---|---|
| 10,596,973 B2* | 3/2020 | Yamazaki | ............. B60N 2/793 |
| 11,220,197 B2* | 1/2022 | Hodgson | ................ B60N 2/793 |
| 11,351,924 B2* | 6/2022 | Xu | ......................... E05F 15/73 |
| 11,383,650 B2* | 7/2022 | Fukui | ....................... B60R 7/04 |
| 2003/0218004 A1 | 11/2003 | Yoneyama et al. | |
| 2008/0210048 A1 | 9/2008 | Yoneyama et al. | |
| 2022/0063504 A1* | 3/2022 | Hodgson | ................... B60R 7/04 |
| 2022/0074252 A1* | 3/2022 | Bijlholt | ................... E05F 15/63 |
| 2023/0192002 A1* | 6/2023 | Boinais | .................... B60R 7/04 |
| | | | 296/37.8 |

FOREIGN PATENT DOCUMENTS

| | | | |
|---|---|---|---|
| DE | 102019131312 A1 * | 6/2021 | |
| JP | H04-083834 U | 7/1992 | |
| JP | 2004-58864 A | 2/2004 | |
| JP | 2007-145165 A | 6/2007 | |
| JP | 2013-241040 A | 12/2013 | |
| JP | 2015-030439 A | 2/2015 | |
| JP | 2019-156278 A | 9/2019 | |

* cited by examiner

DOUBLE OPENING STORAGE DEVICE

TECHNICAL FIELD

The present invention relates to a double opening storage device.

BACKGROUND ART

Conventionally, storage devices such as a console box mounted in a vehicle compartment have been known. For example, Japanese Laid-Open Patent Publication No. 2019-156278 and Japanese Laid-Open Patent Publication No. 2013-241040 each disclose a storage device having a heater provided inside a lid member used as an arm rest. In this storage device, the lid member is a member for covering an opening of a box body in an openable/closable manner and is supported rotatably around one rotation shaft by a support member. The heater is connected to a power supply device via a wire drawn from the support member side of the lid member to the box body side, and generates heat through supply of power via the wire from the power supply device. Thus, a forearm of a vehicle occupant put on an upper surface of the lid member is warmed using the heater.

As another example, Japanese Laid-Open Patent Publication No. 2007-145165 discloses a double opening storage device that supports one lid member rotatably around each of two rotation shafts. This storage device includes an open/close mechanism configured to open/close the lid member around, selectively, one of a first rotation shaft and a second rotation shaft. The open/close mechanism has a hinge member provided so as to be interposed between a box body and the lid member. The hinge member is an arm member having one end supported swingably around the first rotation shaft by the lid member, and another end supported swingably around the second rotation shaft by the box body.

SUMMARY OF INVENTION

Technical Problem

In a case of applying the heater of Japanese Laid-Open Patent Publication No. 2019-156278 to the double opening storage device of Japanese Laid-Open Patent Publication No. 2007-145165, since there are two rotation shafts for rotating the lid member, if the wire connecting the heater on the lid member side and the power supply device on the box body side is drawn to the box body side directly from the side of the support member that supports one rotation shaft, the lid member is hindered from rotating around the other rotation shaft.

The present invention has been made in view of the above circumstances, and an object of the present invention is to provide a double opening storage device in which a lid member is configured to be openable/closable around each of two rotation shafts and wiring of a wiring member such as a wire connected to an actuation device such as a heater provided at the lid member is established.

Solution to Problem

An aspect of the present invention is directed to a double opening storage device including: a box body having a storage portion having an opening; a lid member covering the opening in an openable/closable manner; an open/close mechanism configured to open/close the lid member around, selectively, one of a first rotation shaft and a second rotation shaft; and an actuation device provided at the lid member and supplied with power or fluid from the box body side via a wiring member. The open/close mechanism has a hinge member provided so as to be interposed between the box body and the lid member, the hinge member having one end supported swingably around the first rotation shaft by the lid member and another end supported swingably around the second rotation shaft by the box body. When the lid member is opened/closed around the first rotation shaft, the hinge member stays on the box body side without following the lid member, and when the lid member is opened/closed around the second rotation shaft, the hinge member swings relative to the box body so as to follow the lid member. The wiring member has a hinge wiring portion extending and wired along the hinge member between the one end and the other end.

In this configuration, the wiring member connecting the box body side and the actuation device on the lid member side extends and is wired, along the hinge member provided to the open/close mechanism, between one end and the other end of the hinge member. When the lid member is opened/closed around the first rotation shaft, the hinge member stays on the box body side without following the lid member, and when the lid member is opened/closed around the second rotation shaft, the hinge member swings relative to the box body so as to follow the lid member. Thus, while the lid member is configured to be openable/closable around each of the first rotation shaft and the second rotation shaft, wiring of the wiring member connected to the actuation device provided at the lid member is established.

DESCRIPTION OF EMBODIMENTS

Figure 1:
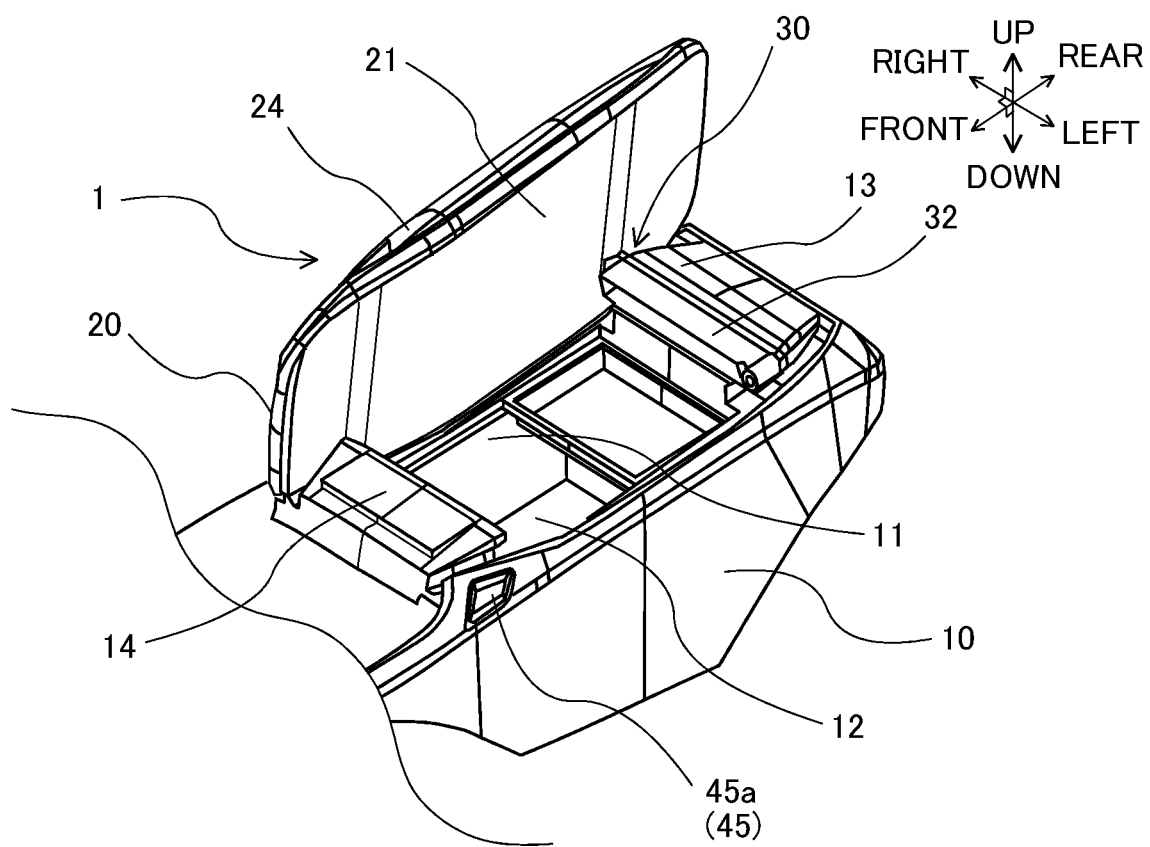
FIG. 1 is a perspective view of a double opening storage device according to an embodiment of the present invention when a lid member thereof is opened on the left side.
Figure 2:
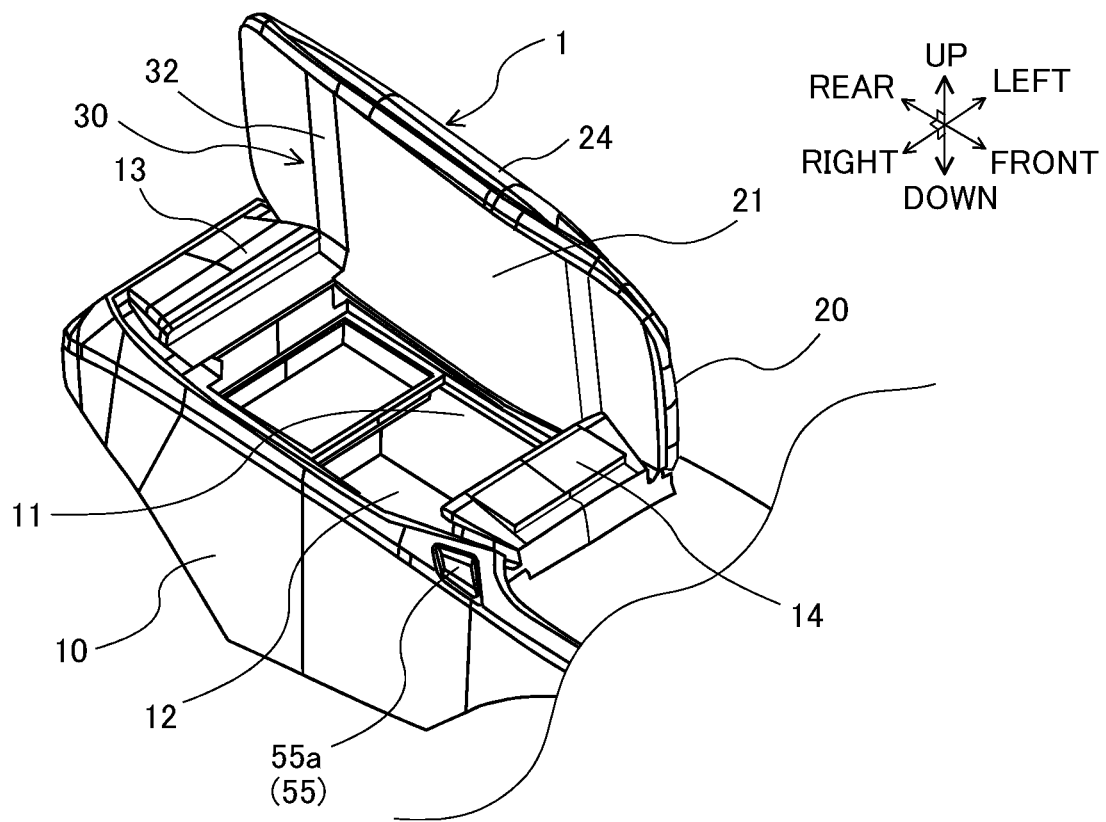
FIG. 2 is a perspective view of the double opening storage device of the present embodiment when the lid member is opened on the right side.
Figure 3:
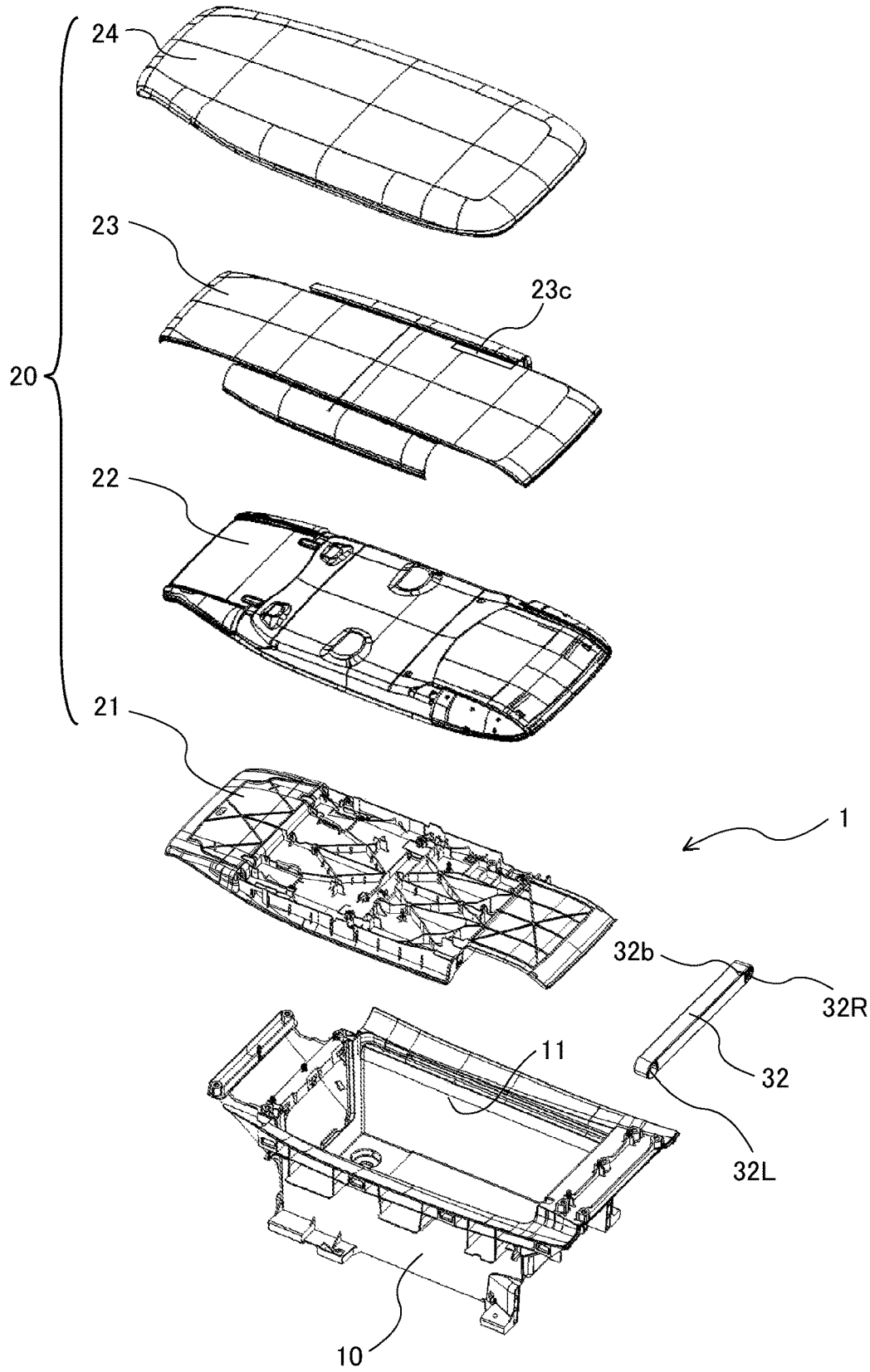
FIG. 3 is an exploded perspective view of the double opening storage device of the present embodiment.
Figure 4:
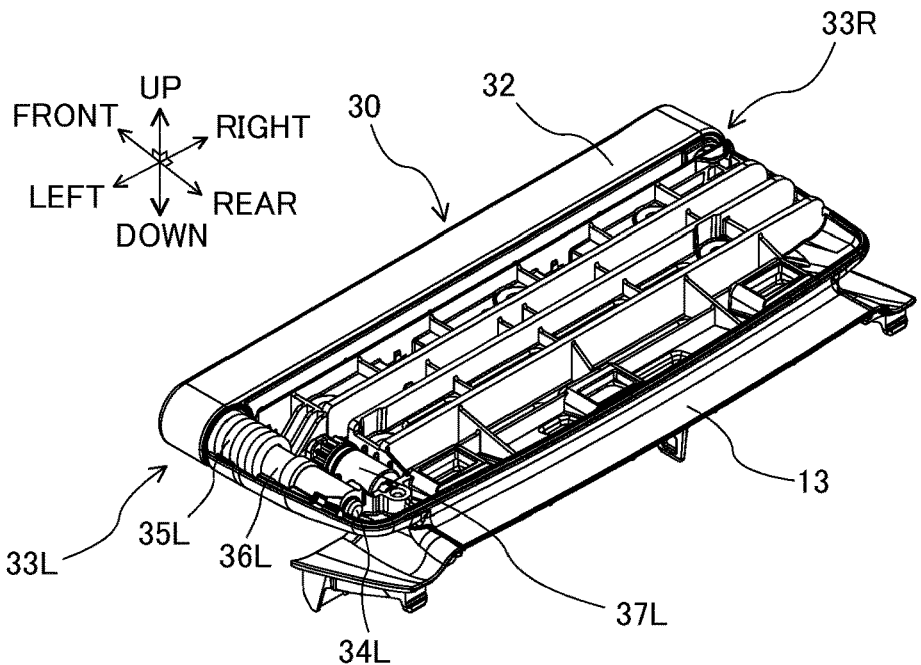
FIG. 4 is a perspective view of a hinge member provided to an open/close mechanism included in the double opening storage device of the present embodiment.

Hereinafter, a specific embodiment of a double opening storage device according to the present invention will be described with reference to the drawings.

With reference to FIG. 1 to FIG. 20, a double opening storage device 1 according to an embodiment will be described.

The double opening storage device 1 is a console box mounted to a center console provided in a compartment of a vehicle, for example. The double opening storage device 1 is vehicular interior equipment to be contacted with a vehicle occupant. In the present embodiment, directions are defined using, as a reference, the vehicle to which the double opening storage device 1 is provided. For example, a "right side" refers to a vehicle right side with respect to the vehicle advancing direction, and a "left side" refers to a vehicle left side with respect to the vehicle advancing direction.

As shown in FIG. 1, FIG. 2, FIG. 3, FIG. 15, and the like, the double opening storage device 1 includes a box body 10, a lid member 20, an open/close mechanism 30, and an actuation device 90. The double opening storage device 1 is configured such that the lid member 20 is opened/closed relative to the box body 10 by the open/close mechanism 30. The double opening storage device 1 is used as an arm rest for putting a forearm of the occupant thereon when the lid member 20 is at a closed position, and the actuation device 90 is actuated at the lid member 20.

The box body 10 is a box that allows an object to be stored therein. The box body 10 has a storage portion 12 formed in a rectangular parallelepiped shape and having an opening 11 at an upper surface thereof. The box body 10 may have any shape that has a side wall and a bottom wall enclosing the storage portion 12, and for example, may include a frame for storing a cup holder or the like.

The opening 11 is formed in a quadrangular shape. The peripheral edge of the opening 11 has two front-rear sides 11a extending in the front-rear direction, and two left-right sides 11b extending in a direction perpendicular to each front-rear side 11a, i.e., in the left-right direction. That is, the double opening storage device 1 is formed and placed such that the front-rear sides 11a of the opening 11 extend in the front-rear direction and the left-right sides 11b of the opening 11 extend in the left-right direction.

The lid member 20 is a lid that covers the opening 11 of the box body 10 in an openable/closable manner, and is usable as an arm rest. The lid member 20 is formed in a size corresponding to the opening 11 of the box body 10. The lid member 20 is formed in a thin and rectangular shape. From a closed position at which the lid member 20 covers the opening 11, the lid member 20 is rotatable around a rotation shaft (hereinafter, referred to as first rotation shaft) extending in the front-rear direction along the right front-rear side 11a of the peripheral edge of the opening 11, and is rotatable around a rotation shaft (hereinafter, referred to as second rotation shaft) extending in the front-rear direction along the left front-rear side 11a of the peripheral edge of the opening 11. At each of the left and the right with respect to the box body 10, the lid member 20 is openable from the closed position to a full-open position at a predetermined angle (e.g., 100°).

The lid member 20 has an inner lid material 21, an outer lid material 22, a formed urethane material 23, and a skin material 24. The inner lid material 21 and the outer lid material 22 are parts forming a base material of the lid member 20. The inner lid material 21 and the outer lid material 22 are each formed in a rectangular plate shape. The outer lid material 22 covers an upper surface of the inner lid material 21 and is formed in a slightly rounded shape in the outer appearance. The inner lid material 21 and the outer lid material 22, with components of the open/close mechanism 30 and the like stored therebetween, are integrated as the base material of the lid member 20 by means such as recess-projection fitting.

The formed urethane material 23 is an auxiliary member located on the top surface of the outer lid material 22 and covering the upper surface of the outer lid material 22, to form an outer shape of the lid member 20. The formed urethane material 23 is formed in a size corresponding to the size of the outer lid material 22. The formed urethane material 23 is provided over substantially the entire area of the upper surface of the outer lid material 22. The formed urethane material 23 is softer than the outer lid material 22.

The formed urethane material 23 has cushion property and flexibility and is made of flexible urethane foam or the like. The formed urethane material 23 is fixed to the upper surface of the outer lid material 22 by an adhesive agent or the like.

The skin material 24 is a bag-shaped member covering an upper surface of the formed urethane material 23, to form an outer surface of the lid member 20. The skin material 24 is formed in a size corresponding to the size of the formed urethane material 23 and therefore the outer lid material 22. The skin material 24 is provided over the entire area of the upper surface of the formed urethane material 23 and therefore the outer lid material 22. In addition, the skin material 24 is provided so as to wrap to a back surface of the lid member 20. The skin material 24 is made of a synthetic leather or fabric such as polyurethane or polyvinyl chloride, a leather, or the like. The skin material 24 may be formed by laminating, with a skin 24b, slab urethane 24a having a higher density than the formed urethane material 23, for example (see FIG. 15). The skin material 24 is fixed to the upper surface of the formed urethane material 23, the lower surface of the inner lid material 21, or the like by an adhesive agent or the like.

The open/close mechanism 30 is a unit for opening/closing the lid member 20 around, selectively, one of the first rotation shaft on the right side and the second rotation shaft on the left side. The open/close mechanism 30 has a hinge member 32, a right pivotal support portion 33R, and a left pivotal support portion 33L, as shown in FIG. 4, FIG. 5, FIG. 6, FIG. 7, and FIG. 8.

The hinge member 32 is a long arm-shaped member. The hinge member 32 is provided so as to be interposed between a rear base 13 of the box body 10 and the lid member 20. The hinge member 32 is provided such that the longitudinal direction thereof extends in the left-right direction when the lid member 20 is at the closed position, and is provided along a side wall portion formed on the vehicle rear side of the lid member 20. The hinge member 32 is formed to have, in the longitudinal direction, substantially the same length as the width in the left-right direction of the lid member 20.

The hinge member 32 is configured such that one longitudinal-direction end is supported swingably around the first rotation shaft by the lid member 20, and another longitudinal-direction end is supported swingably around the second rotation shaft by the rear base 13 of the box body 10. That is, the hinge member 32 is swingable relative to the lid member 20 around the first rotation shaft, and is swingable relative to the rear base 13 of the box body 10 around the second rotation shaft.

The hinge member 32 has two through holes 32R, 32L. The through hole 32R is provided at the one longitudinal-direction end of the hinge member 32 and penetrates in the front-rear direction. The through hole 32L is provided at the other longitudinal-direction end of the hinge member 32 and penetrates in the front-rear direction.

The right pivotal support portion 33R is a part for forming the first rotation shaft and for opening/closing the lid member 20 around the first rotation shaft thereof (i.e., left-side opening/closing). The right pivotal support portion 33R is provided on the vehicle right side, i.e., the one longitudinal-direction end side of the hinge member 32. The right pivotal support portion 33R has a shaft 34R, an arm spring 35R, a tube 36R, and a damper 37R.

The shaft 34R is a collar formed in a cylindrical shape. The shaft 34R is inserted into the through hole 32R frontward from the rear side of the one longitudinal-direction end of the hinge member 32. The rear end side of the shaft 34R is fixed to the hinge member 32. The front end side of the shaft 34R protrudes toward the vehicle front side from the front-side opening of the through hole 32R. The front end side of the shaft 34R is inserted into a support hole (not shown) provided in the inner lid material 21 of the lid member 20, and is supported rotatably relative to the lid member 20. The shaft 34R extends in the front-rear direction along the right front-rear side 11a of the peripheral edge of the opening 11, and forms the first rotation shaft. The hinge member 32 is swingable relative to the lid member 20 by the shaft 34R on the one longitudinal-direction end side.

The arm spring 35R is a torsion spring that generates a biasing force for swinging the hinge member 32 relative to the lid member 20. The arm spring 35R is wound around the shaft 34R. The biasing force of the arm spring 35R is maximized in a state when left-side opening/closing operation of the lid member 20 is not performed, including a state when the lid member 20 is at the closed position. The arm spring 35R is provided with one end fixed to the hinge member 32 and another end fixed to the inner lid material 21 of the lid member 20.

The tube 36R is a hollow tubular member externally fitted to the shaft 34R. The tube 36R is provided coaxially with the shaft 34R. The tube 36R rotates integrally with rotation of the shaft 34R. The tube 36R has external teeth 36Ra. A plurality of external teeth 36Ra are arranged along the outer circumference of the tube 36R.

The damper 37R is a damping device for reducing the swing speed when the hinge member 32 swings relative to the lid member 20 (i.e., when the lid member 20 is opened on the left side). The damper 37R is formed in a cylindrical shape. The damper 37R is attached and fixed to the inner lid material 21 of the lid member 20. The damper 37R has external teeth 37Ra. A plurality of external teeth 37Ra are arranged along the outer circumference of the damper 37R. The external teeth 37Ra of the damper 37R and the external teeth 36Ra of the tube 36R are meshed with each other. The damper 37R provides a damping force for reducing the aforementioned swing speed, to the shaft 34R through the tube 36R.

The left pivotal support portion 33L is a part for forming the second rotation shaft and for opening/closing the lid member around the second rotation shaft thereof (i.e., right-side opening/closing). The left pivotal support portion 33L is provided on the vehicle left side, i.e., the other longitudinal-direction end side of the hinge member 32. The left pivotal support portion 33L has a shaft 34L, an arm spring 35L, a tube 36L, and a damper 37L.

The shaft 34L is a member formed in a columnar shape. The shaft 34L is inserted into the through hole 32L rearward from the front side of the other longitudinal-direction end of the hinge member 32. The front end side of the shaft 34L is fixed to the hinge member 32. The rear end side of the shaft 34L protrudes toward the vehicle rear side from the rear-side opening of the through hole 32L. The rear end side of the shaft 34L is inserted into a support hole 13L provided in the rear base 13 of the box body 10, and is supported rotatably relative to the rear base 13 of the box body 10. The shaft 34L extends in the front-rear direction along the left front-rear side 11a of the peripheral edge of the opening 11, and forms the second rotation shaft. The hinge member 32 is swingable relative to the rear base 13 of the box body 10 by the shaft 34L on the other longitudinal-direction end side.

The arm spring 35L is a torsion spring that generates a biasing force for swinging the hinge member 32 relative to the rear base 13 of the box body 10. The arm spring 35L is wound around the shaft 34L. The biasing force of the arm spring 35L is maximized in a state when right-side opening/ closing operation of the lid member 20 is not performed, including a state when the lid member 20 is at the closed position. The arm spring 35L is provided with one end fixed to the hinge member 32 and another end fixed to the rear base 13 of the box body 10.

The tube 36L is a hollow tubular member externally fitted to the shaft 34L. The tube 36L is provided coaxially with the shaft 34L. The tube 36L rotates integrally with rotation of the shaft 34L. The tube 36L has external teeth 36La. A plurality of external teeth 36La are arranged along the outer circumference of the tube 36L.

The damper 37L is a damping device for reducing the swing speed when the hinge member 32 swings relative to the rear base 13 of the box body 10 (i.e., when the lid member 20 is opened on the right side). The damper 37L is formed in a cylindrical shape. The damper 37L is attached and fixed to the rear base 13 of the box body 10. The damper 37L has external teeth 37La. A plurality of external teeth 37La are arranged along the outer circumference of the damper 37L. The external teeth 37La of the damper 37L and the external teeth 36La of the tube 36L are meshed with each other. The damper 37L provides a damping force for reducing the aforementioned swing speed, to the shaft 34L through the tube 36L.

The open/close mechanism 30 has a lock unit 39. The lock unit 39 is a unit that holds at least one of the right and left sides of the lid member 20 at the closed position relative to the box body 10, and releases closed-position holding of one side while holding the other side at the closed position relative to the box body 10.

The lock unit 39 has a left lock device 40, a right lock device 50, a transmission rod 60, and a flap device 70. The left lock device 40 is a device for holding the left side of the lid member 20 at the closed position and releasing closed-position holding of the left side. The right lock device 50 is a device for holding the right side of the lid member 20 at the closed position and releasing closed-position holding of the right side. The left lock device 40 is located on the left side of the lid member 20. The right lock device 50 is located on the right side of the lid member 20.

The left lock device 40 has a first left rod 41, a second left rod 42, a left synchronization device 43, a left rod biasing member 44, and a left operation portion 45. The first left rod 41 is a rod member provided on the rear side of the lid member 20 and extending substantially in the front-rear direction. The second left rod 42 is a rod member provided on the front side of the lid member 20 and extending substantially in the front-rear direction. The first left rod 41 and the second left rod 42 are supported so as to be movable to advance/retract in the front-rear direction relative to the lid member 20.

The first left rod 41 is movable frontward/rearward between a state in which a rear end thereof protrudes rearward relative to the rear end of the body of the lid member 20 and a state in which the rear end of the first left rod 41 enters into the body of the lid member 20. The hinge member 32 has, at a front surface thereof, an engagement hole 32H into which the first left rod 41 is inserted and engaged. The rear end of the first left rod 41 is inserted into the engagement hole 32H of the hinge member 32 and is engaged therewith, when protruding rearward relative to the rear end of the body of the lid member 20. That is, the rear end of the first left rod 41 is inserted/extracted into/from the engagement hole 32H at the front surface of the hinge member 32, thus being switchable between engagement and disengagement with and from the hinge member 32.

The second left rod 42 is movable frontward/rearward between a state in which a front end thereof protrudes frontward relative to the front end of the body of the lid member 20 and a state in which the front end of the second left rod 42 enters into the body of the lid member 20. A front base 14 of the box body 10 has, at a rear surface thereof, an engagement hole 14a into which the second left rod 42 is inserted and engaged. The front end of the second left rod 42 is inserted into the engagement hole 14a of the front base 14 of the box body 10 and is engaged therewith, when protruding frontward relative to the front end of the body of the lid member 20. That is, the front end of the second left rod 42 is inserted/extracted into/from the engagement hole 14a at the rear surface of the front base 14 of the box body 10, thus being switchable between engagement and disengagement with and from the front base 14. The second left rod 42 forms the second rotation shaft when engaged with the front base 14.

The left synchronization device 43 is a device for synchronously moving the first left rod 41 and the second left rod 42 in directions to approach each other or directions away from each other. The left synchronization device 43 is provided between a front end of the first left rod 41 and a rear end of the second left rod 42. The left synchronization device 43 is a disk-shaped rotary body rotatably supported by the inner lid material 21 of the lid member 20. At the left synchronization device 43, the front end of the first left rod 41 is rotatably supported and the rear end of the second left rod 42 is rotatably supported. A support point for the first left rod 41 and a support point for the second left rod 42 at the left synchronization device 43 are separated from each other by substantially 180° in the circumferential direction, and are located substantially symmetrically with respect to the rotation center of the left synchronization device 43.

The left rod biasing member 44 is a helical spring that generates a biasing force for biasing the second left rod 42 frontward relative to the lid member 20. The left rod biasing member 44 is provided with one end fixed to the second left rod 42 and another end fixed to the inner lid material 21 of the lid member 20. The biasing force of the left rod biasing member 44 serves as a force for rotating the left synchronization device 43 clockwise (right turn) as seen from above through forward biasing for the second left rod 42, thus producing a force for biasing the first left rod 41 rearward relative to the lid member 20.

The left operation portion 45 is a part to be pressed by an operator for releasing closed-position holding of the left side of the lid member 20. The left operation portion 45 is provided on the left side of the front base 14 of the box body 10. The left operation portion 45 has a button portion 45a to be touched when the operator performs pressing operation, and a mechanism portion 45b for engaging the button portion 45a and the second left rod 42 with each other.

The button portion 45a is provided at the left side wall of the front base 14 so as to be slidable in the left-right direction. The button portion 45a is biased leftward relative to the front base 14 by a spring (not shown), and is held so as to be flush with the left side wall of the front base 14 in a state in which the operator does not press the button portion 45a rightward. The button portion 45a is moved rightward relative to the front base 14 against the biasing force of the spring by the operator's pressing operation.

In a state in which the button portion 45a is not pressed rightward, i.e., the button portion 45a is flush with the left side wall of the front base 14, the mechanism portion 45b is not in contact with the front end of the second left rod 42. Meanwhile, when the button portion 45a is pressed rightward, the mechanism portion 45b comes into contact with the front end of the second left rod 42 and moves the second left rod 42 rearward into the lid member 20 against the biasing force of the left rod biasing member 44. When the second left rod 42 is moved rearward, the left synchronization device 43 rotates leftward, whereby the first left rod 41 moves frontward.

In a state in which the lid member 20 is closed and the button portion 45a of the left operation portion 45 is not pressed rightward, or in a state in which the lid member 20 is opened on the right side, the front end of the second left rod 42 protrudes frontward relative to the front end of the body of the lid member 20 and is engaged with the front base 14 of the box body 10. At this time, the rear end of the first left rod 41 protrudes rearward relative to the rear end of the body of the lid member 20 and is engaged with the hinge member 32. Hereinafter, this state is referred to as left locked state.

If the button portion 45a of the left operation portion 45 is pressed rightward in the closed state of the lid member 20, the front end of the second left rod 42 is moved rearward relative to the front end of the body of the lid member 20 and enters into the lid member 20, whereby engagement between the second left rod 42 and the front base 14 is released. At this time, through leftward rotation of the left synchronization device 43, the rear end of the first left rod 41 is moved frontward relative to the rear end of the body of the lid member 20 and enters into the lid member 20, whereby engagement between the first left rod 41 and the hinge member 32 is released. Hereinafter, this state is referred to as left lock released state. Desirably, the left lock device 40 is configured such that release of engagement between the second left rod 42 and the front base 14 of the box body 10 and release of engagement between the first left rod 41 and the hinge member 32 are performed substantially at the same timing.

The right lock device 50 has a first right rod 51, a second right rod 52, a right synchronization device 53, a right rod biasing member 54, and a right operation portion 55. The first right rod 51 is a rod member provided on the rear side of the lid member 20 and extending substantially in the front-rear direction. The second right rod 52 is a rod member provided on the front side of the lid member 20 and extending substantially in the front-rear direction. The first right rod 51 and the second right rod 52 are supported so as to be movable to advance/retract in the front-rear direction relative to the lid member 20.

The rear end of the first right rod 51 is inserted into a through hole 34Ra formed at the center of the shaft 34R of the right pivotal support portion 33R. The first right rod 51 is movable frontward/rearward between a state in which the rear end thereof protrudes rearward relative to the rear end of the body of the lid member 20 and further protrudes rearward relative to a rear end of the hinge member 32, and a state in which the rear end of the first right rod 51 enters into the hinge member 32. The rear base 13 of the box body 10 has, at a front surface thereof, an engagement hole 13a into which the first right rod 51 is inserted and engaged. The rear end of the first right rod 51 is inserted into the engagement hole 13a of the rear base 13 of the box body 10 and is engaged therewith, when protruding rearward relative to the rear end of the hinge member 32. That is, the rear end of the first right rod 51 is inserted/extracted into/from the engagement hole 13a at the front surface of the rear base 13 of the box body 10 through the through hole 34Ra formed at the center of the shaft 34R in the hinge member 32, thus being switchable between engagement and disengagement with and from the rear base 13.

The second right rod 52 is movable frontward/rearward between a state in which a front end thereof protrudes frontward relative to the front end of the body of the lid member 20 and a state in which the front end of the second right rod 52 enters into the body of the lid member 20. The front base 14 of the box body 10 has, at the rear surface thereof, an engagement hole 14b into which the second right rod 52 is inserted and engaged. The front end of the second right rod 52 is inserted into the engagement hole 14b of the front base 14 of the box body 10 and is engaged therewith, when protruding frontward relative to the front end of the body of the lid member 20. That is, the front end of the second right rod 52 is inserted/extracted into/from the engagement hole 14b at the rear surface of the front base 14 of the box body 10, thus being switchable between engagement and disengagement with and from the front base 14. The second right rod 52 forms the first rotation shaft when engaged with the front base 14.

The right synchronization device 53 is a device for synchronously moving the first right rod 51 and the second right rod 52 in directions to approach each other or directions away from each other. The right synchronization device 53 is provided between a front end of the first right rod 51 and a rear end of the second right rod 52. The right synchronization device 53 is a disk-shaped rotary body rotatably supported by the inner lid material 21 of the lid member 20. At the right synchronization device 53, the front end of the first right rod 51 is rotatably supported and the rear end of the second right rod 52 is rotatably supported. A support point for the first right rod 51 and a support point for the second right rod 52 at the right synchronization device 53 are separated from each other by substantially 180° in the circumferential direction, and are located substantially symmetrically with respect to the rotation center of the right synchronization device 53.

The right rod biasing member 54 is a helical spring that generates a biasing force for biasing the second right rod 52 frontward relative to the lid member 20. The right rod biasing member 54 is provided with one end fixed to the second right rod 52 and another end fixed to the inner lid material 21 of the lid member 20. The biasing force of the right rod biasing member 54 serves as a force for rotating the right synchronization device 53 counterclockwise (left turn) as seen from above through forward biasing for the second right rod 52, thus producing a force for biasing the first right rod 51 rearward relative to the lid member 20.

The right operation portion 55 is a part to be pressed by the operator for releasing the closed-position holding of the right side of the lid member 20. The right operation portion 55 is provided on the right side of the front base 14 of the box body 10. The right operation portion 55 has a button portion 55a to be touched when the operator performs pressing operation, and a mechanism portion 55b for engaging the button portion 55a and the second right rod 52 with each other.

The button portion 55a is provided at the right side wall of the front base 14 so as to be slidable in the left-right direction. The button portion 55a is biased rightward relative to the front base 14 by a spring (not shown), and is held so as to be flush with the right side wall of the front base 14 in a state in which the operator does not press the button portion 55a leftward. The button portion 55a is moved leftward relative to the front base 14 against the biasing force of the spring by the operator's pressing operation.

In a state in which the button portion 55a is not pressed leftward, i.e., a state in which the button portion 55a is flush with the right side wall of the front base 14, the mechanism portion 55b is not in contact with the front end of the second right rod 52. Meanwhile, when the button portion 55a is pressed leftward, the mechanism portion 55b comes into contact with the front end of the second right rod 52 and moves the second right rod 52 rearward into the lid member 20 against the biasing force of the right rod biasing member 54. When the second right rod 52 is moved rearward, the right synchronization device 53 rotates rightward, whereby the first right rod 51 moves frontward.

In a state in which the lid member 20 is closed and the button portion 55a of the right operation portion 55 is not pressed leftward, or in a state in which the lid member 20 is opened on the left side, the front end of the second right rod 52 protrudes frontward relative to the front end of the body of the lid member 20 and is engaged with the front base 14 of the box body 10. At this time, the rear end of the first right rod 51 protrudes rearward relative to the rear end of the hinge member 32 and is engaged with the rear base 13 of the box body 10 through the hinge member 32. Hereinafter, this state is referred to as right locked state.

If the button portion 55a of the right operation portion 55 is pressed leftward in the closed state of the lid member 20, the front end of the second right rod 52 is moved rearward relative to the front end of the body of the lid member 20 and enters into the lid member 20, whereby engagement between the second right rod 52 and the front base 14 is released. At this time, through rightward rotation of the right synchronization device 53, the rear end of the first right rod 51 is moved frontward relative to the rear end of the hinge member 32 and enters into the hinge member 32, whereby engagement between the first right rod 51 and the rear base 13 is released. Hereinafter, this state is referred to as right lock released state. Desirably, the right lock device 50 is configured such that release of engagement between the second right rod 52 and the front base 14 of the box body 10 and release of engagement between the first right rod 51 and the rear base 13 of the box body 10 are performed substantially at the same timing.

The transmission rod 60 is a member for preventing one of the left lock device 40 and the right lock device 50 from coming into the lock released state from the locked state when the other one is in the lock released state. The transmission rod 60 extends in the left-right direction, and is supported so as to be movable in the left-right direction along a guide 61 provided to the inner lid material 21 of the lid member 20. The transmission rod 60 has a right end supported by a front portion of the right synchronization device 53, and a left end set as a free end. The transmission rod 60 moves rightward when the right synchronization device 53 rotates rightward, and moves leftward when the right synchronization device 53 rotates leftward.

Figure 6:
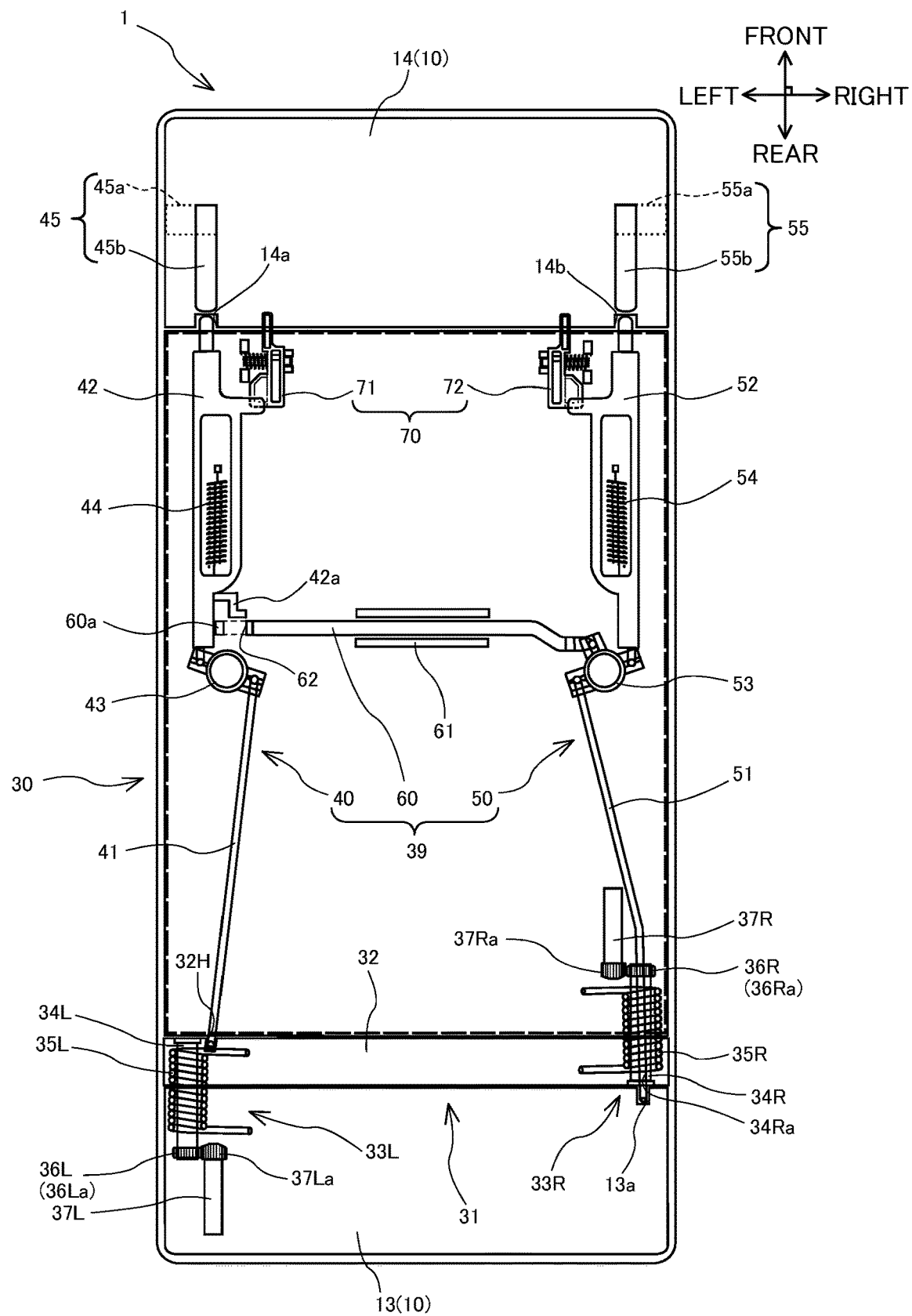
FIG. 6 is a structure view of the open/close mechanism included in the double opening storage device of the present embodiment, in a closed state.

The transmission rod 60 has, on the left end side, an engagement hole 62 penetrating in the front-rear direction. The engagement hole 62 is engageable with an engagement projection 42a provided integrally with the second left rod 42. As shown in FIG. 6, in the closed state of the lid member 20 (i.e., in the left locked state and the right locked state), the engagement projection 42a is not engaged with the engagement hole 62 and faces the engagement hole 62 at a position frontward of the engagement hole 62.

Figure 7:
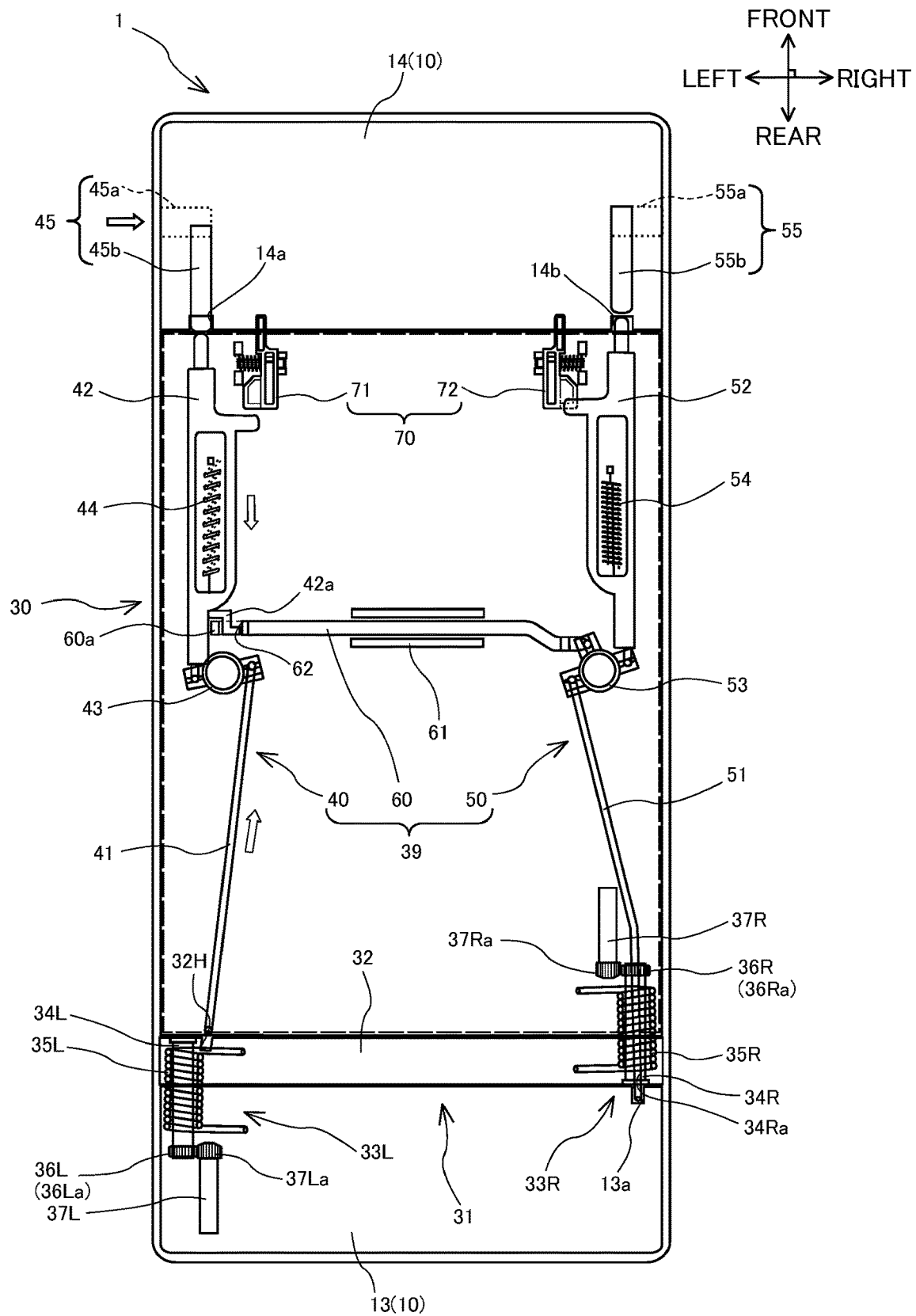
FIG. 7 is a structure view of the open/close mechanism included in the double opening storage device of the present embodiment, when the lid member is opened on the left side.

On the other hand, when the second left rod 42 is moved rearward in the closed state of the lid member 20 and thus the lid member 20 comes into the left lock released state, as shown in FIG. 7, the engagement projection 42a is engaged with the engagement hole 62. Thus, in the left lock released state, the transmission rod 60 is restricted from moving in the left-right direction, so that the first and second right rods 51, 52 are restricted from moving in the front-rear direction and the right lock device 50 is prevented from coming into the right lock released state.

Figure 8:
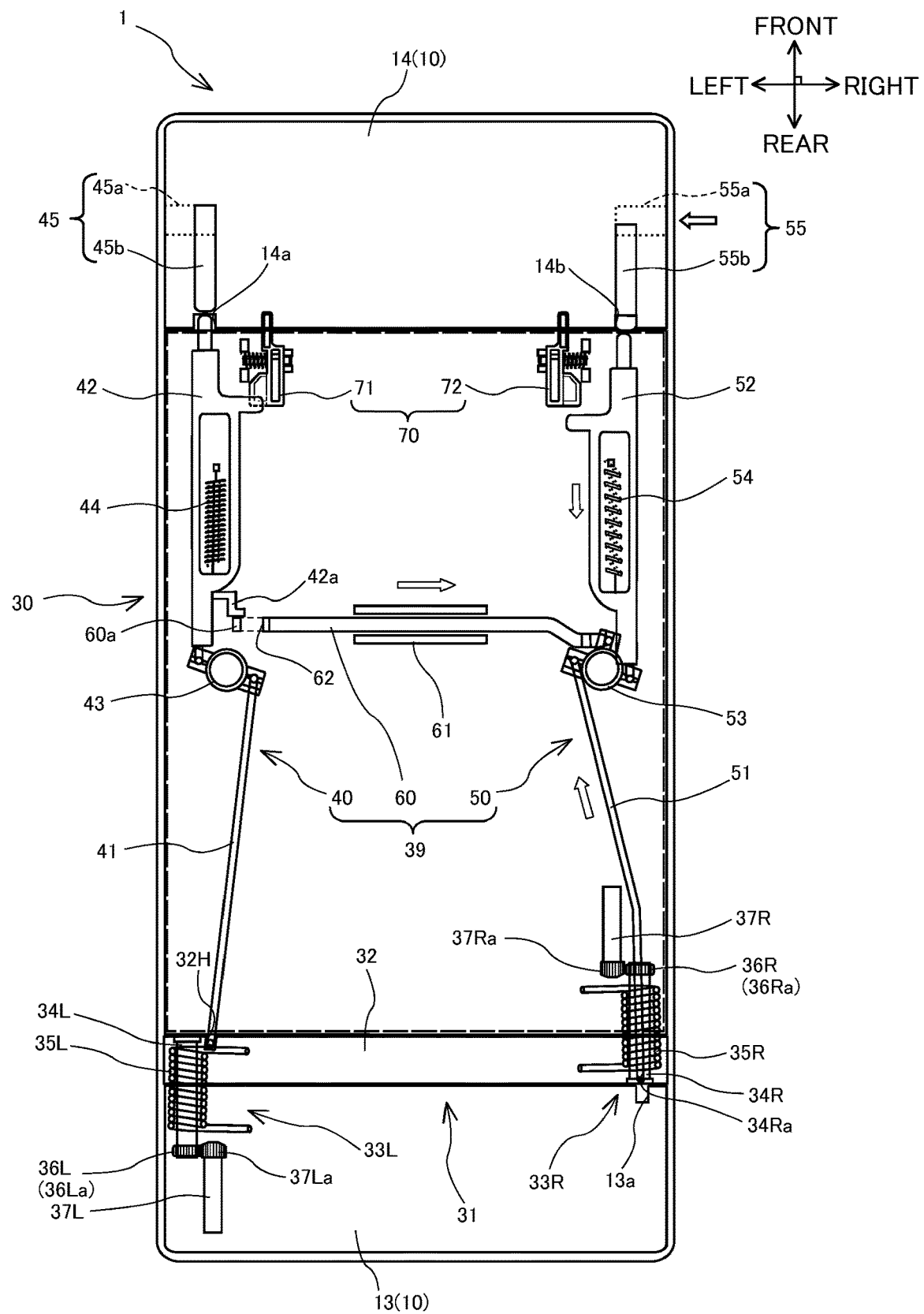
FIG. 8 is a structure view of the open/close mechanism included in the double opening storage device of the present embodiment, when the lid member is opened on the right side.

In addition, when the second right rod 52 is moved rearward in the closed state of the lid member 20 and thus the lid member 20 comes into the right lock released state, as shown in FIG. 8, the transmission rod 60 moves rightward, and at a position frontward of an end 60a of the transmission rod 60 adjacent to the left side of the engagement hole 62, the engagement projection 42a faces the end 60a. In this facing state, even if the first and second left rods 41, 42 attempt to move in the front-rear direction, the engagement projection 42a abuts on the end 60a of the transmission rod 60. Thus, in the right lock released state, the first and second left rods 41, 42 are restricted from moving in the front-rear direction and the left lock device 40 is prevented from coming into the left lock released state.

The flap device 70 includes a left flap device 71 for keeping the left lock device 40 in the left lock released state when the lid member 20 is in the right locked state and the left lock released state, i.e., is opened on the left side, and a right flap device 72 for keeping the right lock device 50 in the right lock released state when the lid member 20 is in the left locked state and the right lock released state, i.e., is opened on the right side. The left flap device 71 is provided on the left front side of the lid member 20 and is engageable with the left lock device 40. The right flap device 72 is provided on the right front side of the lid member 20 and is engageable with the right lock device 50.

Next, operation of the double opening storage device 1 will be described.

Figure 11:
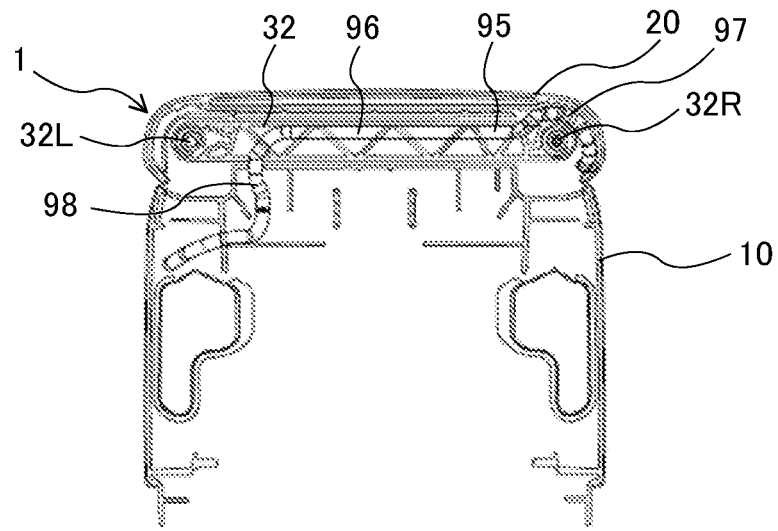
FIG. 11 is a sectional view of the double opening storage device of the present embodiment when the lid member is closed, as seen from the rear side.

In the double opening storage device 1, in the closed state of the lid member 20, the first left rod 41 is engaged with the hinge member 32, the first right rod 51 is engaged with the rear base 13 of the box body 10 through the hinge member 32, and the second left rod 42 and the second right rod 52 are engaged with the front base 14 of the box body 10. Thus, as shown in FIG. 11, the lid member 20 is kept in a closed state in which the opening 11 of the box body 10 is closed.

In the above closed state of the lid member 20, if the button portion 45a of the left operation portion 45 is pressed rightward, the second left rod 42 moves rearward, and the left synchronization device 43 rotates leftward so that the first left rod 41 moves frontward. When these movements are performed until engagement between the second left rod 42 and the front base 14 of the box body 10 is released and engagement between the first left rod 41 and the hinge member 32 is released, the left lock device 40 comes into the left lock released state while the first and second right rods 51, 52 are kept in a state of being engaged with the box body 10 (i.e., the right locked state of the right lock device 50). Thus, while the right side of the lid member 20 is held in the closed state, closed-state holding of the left side of the lid member 20 is released.

Figure 12:
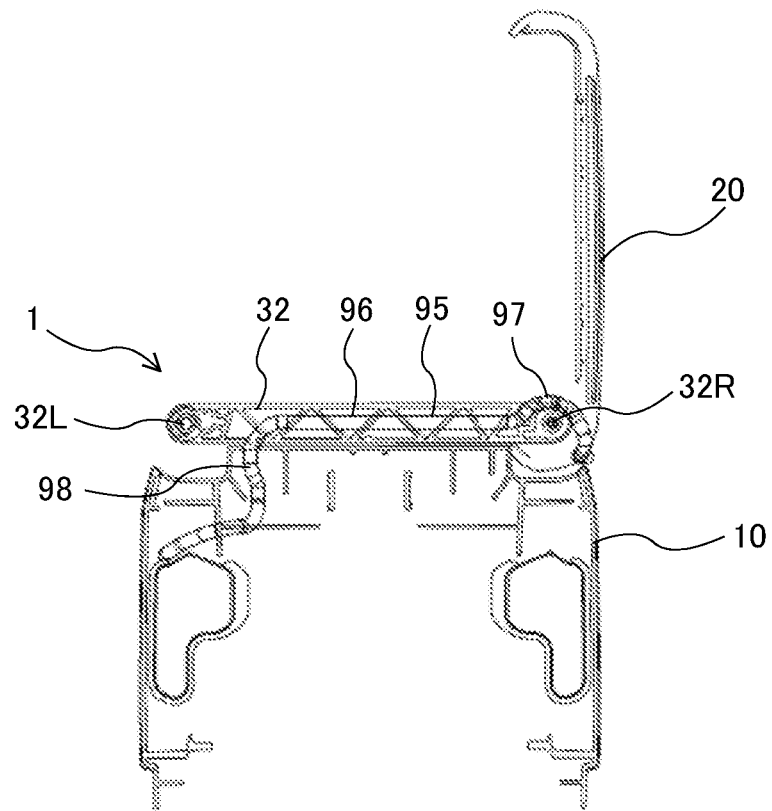
FIG. 12 is a sectional view of the double opening storage device of the present embodiment when the lid member is opened on the left side, as seen from the rear side.

When the lid member 20 has come into the left lock released state, the hinge member 32 does not swing relative to the rear base 13 of the box body 10, and meanwhile, the lid member 20 swings relative to the hinge member 32 by the biasing force of the arm spring 35R of the right pivotal support portion 33R. Therefore, in the case where the button portion 45a of the left operation portion 45 is pressed rightward, as shown in FIG. 12, the lid member 20 pivots around the first rotation shaft on the right side relative to the hinge member 32 and therefore the box body 10, in a state in which the hinge member 32 is integrated with the box body 10. Thus, the left side of the lid member 20 is opened toward the opened position.

In the above closed state of the lid member 20, if the button portion 55a of the right operation portion 55 is pressed leftward, the second right rod 52 moves rearward, and the right synchronization device 53 rotates rightward so that the first right rod 51 moves frontward. When these movements are performed until engagement between the second right rod 52 and the front base 14 of the box body 10 is released and engagement between the first right rod 51 and the rear base 13 of the box body 10 is released, the right lock device 50 comes into the right lock released state while the first and second left rods 41, 42 are kept in a state of being engaged with the front base 14 of the box body 10 or the hinge member 32 (i.e., the left locked state of the left lock device 40). Thus, while the left side of the lid member 20 is held in the closed state, closed-state holding of the right side of the lid member 20 is released.

Figure 13:
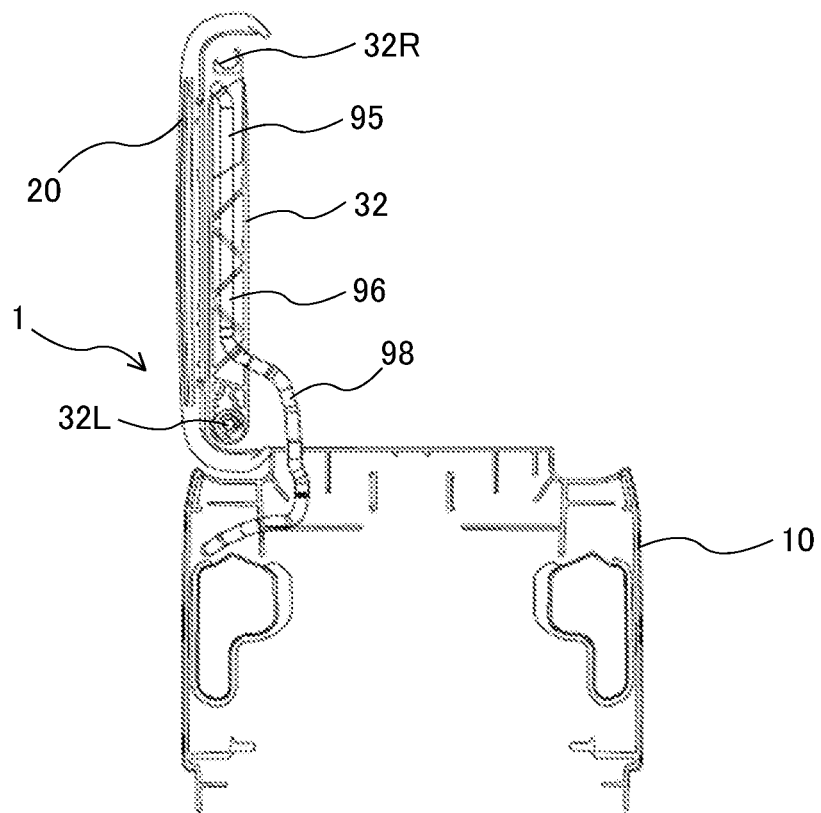
FIG. 13 is a sectional view of the double opening storage device of the present embodiment when the lid member is opened on the right side, as seen from the rear side.

When the lid member 20 has come into the right lock released state, the lid member 20 does not swing relative to the hinge member 32, and meanwhile, the hinge member 32 swings relative to the rear base 13 of the box body 10 by the biasing force of the arm spring 35L of the left pivotal support portion 33L. Therefore, in the case where the button portion 55a of the right operation portion 55 is pressed leftward, as shown in FIG. 13, the lid member pivots around the second rotation shaft on the left side relative to the box body 10, in a state in which the lid member 20 is integrated with the hinge member 32. Thus, the right side of the lid member 20 is opened toward the opened position.

As described above, in the double opening storage device 1, from the closed state in which the lid member 20 covers the opening 11 of the box body 10, the lid member 20 is openable toward the left-side opened position around the first rotation shaft on the right side, and is openable toward the right-side opened position around the second rotation shaft on the left side. The lid member 20 is openable/closable around, selectively, one of the first rotation shaft and the second rotation shaft. When the lid member 20 is opened/closed around the first rotation shaft on the right side, the hinge member 32 of the open/close mechanism 30 stays on the box body 10 side without following the lid member 20, and when the lid member 20 is opened/closed around the second rotation shaft on the left side, the hinge member 32 swings relative to the box body 10 so as to follow the lid member 20.

The actuation device 90 is a device actuated by being supplied with power or fluid from, for example, a power supply device or a fluid generation source on the box body 10 side. The actuation device 90 is a heater or a cooler used for a purpose such as warming or cooling a forearm put by the vehicle occupant on the upper surface of the lid member 20 as an arm rest, or a lighting device such as a light or an illumination for lighting or blinking, for example. Hereinafter, the actuation device 90 is assumed to be a heater for generating heat through supply of power.

Figure 9:
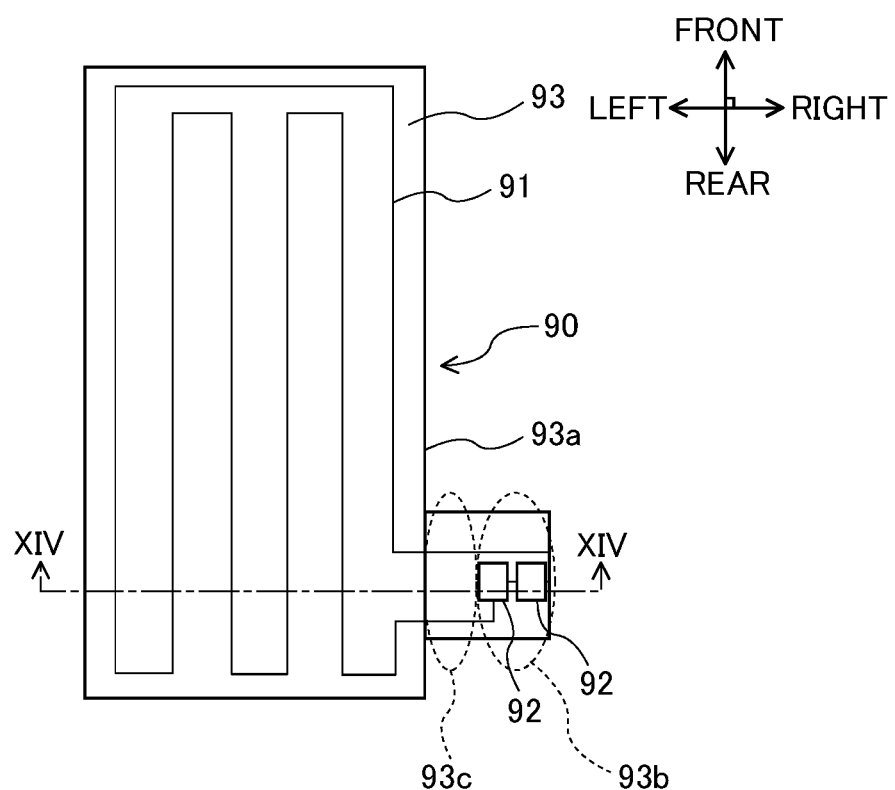
FIG. 9 is a structure view of an actuation device provided to the lid member included in the double opening storage device of the present embodiment.
Figure 14:
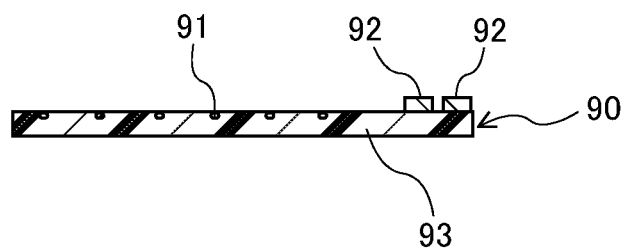
FIG. 14 is a sectional view of the actuation device shown in FIG. 9, taken along line XIV-XIV.

The actuation device 90 is provided at the lid member 20. The actuation device 90 is a heater device for warming the top surface of the lid member 20. As shown in FIG. 9 and FIG. 14, the actuation device 90 includes a heating body 91 and a control portion 92.

The heating body 91 is a heater element for generating heat through supply of power. The heating body 91 is a surface heater in which a heat wire member extending in a line shape is arranged in a surface shape and electrodes are connected by one heat wire member or two parallel heat wire members, for example. The heating body 91 is located in the vicinity of the top surface of the lid member 20, and specifically, is located on the top surface side of the formed urethane material 23, i.e., between the formed urethane material 23 and the skin material 24. The heating body 91 is arranged and formed so as to spread over the entire area of the upper surface of the lid member 20.

Desirably, the heating body 91 is provided over an area including a part that a finger of the vehicle occupant is likely to touch when a forearm of the vehicle occupant is put on the upper surface of the lid member 20, i.e., a top surface facing frontward and obliquely upward frontward of the lid member 20 or a back surface facing downward of the lid member 20 (e.g., a peripheral edge back surface of the lid member 20).

The control portion 92 is a part for controlling heat generation of the heating body 91. The control portion 92 includes a thermistor and a thermostat for adjusting the temperature of the heating body 91, and the like. The control portion 92 is obtained by covering the thermistor and the like with a case such as a resin case. The control portion 92 is harder than the heating body 91, and is harder than the formed urethane material 23. The control portion 92 is electrically connected to the heating body 91. The control portion 92 is located at a position closer to the first rotation shaft serving as a rotation shaft when the lid member 20 and the hinge member 32 swing relative to each other, than to the second rotation shaft which does not serve as a rotation shaft when the lid member 20 and the hinge member 32 swing relative to each other. The control portion 92 is located at such a position that a tactile feeling perceived by a forearm is not impaired when the vehicle occupant has put the forearm on the upper surface of the lid member 20, as described later in detail.

The actuation device 90 has a sheet portion 93. The sheet portion 93 is a part to which the heating body 91 and the control portion 92 are attached. The sheet portion 93 has insulating property and is formed in a sheet shape. As described later in detail, the sheet portion 93 is mainly provided between the formed urethane material 23 and the skin material 24 of the lid member 20. The sheet portion 93 is formed so as to correspond to the size of an area where heat is generated by the heating body 91. The heating body 91 may be attached on one sheet portion 93 or may be interposed between two sheet portions 93.

Figure 15:
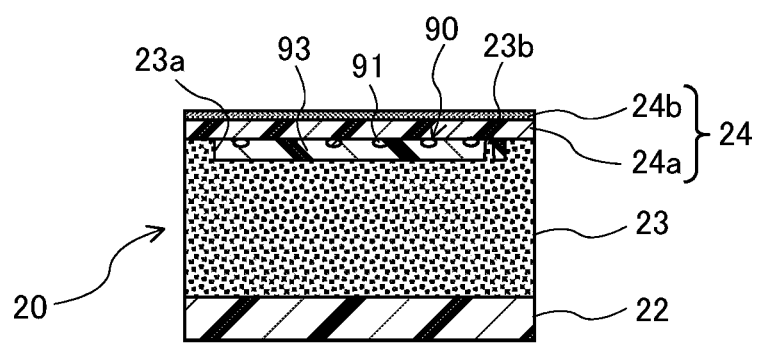
FIG. 15 is a sectional view of the lid member included in the double opening storage device of the present embodiment.
Figure 17:
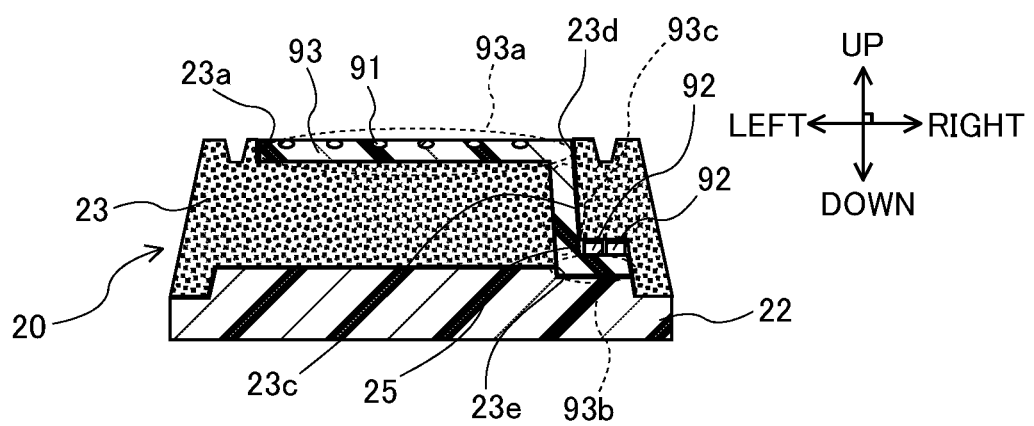
FIG. 17 is a sectional view of a specific part of the actuation device provided to the lid member included in the double opening storage device of the present embodiment, taken along a vertical plane extending in the vehicle left-right direction, as seen from the rear of the vehicle.
Figure 18:
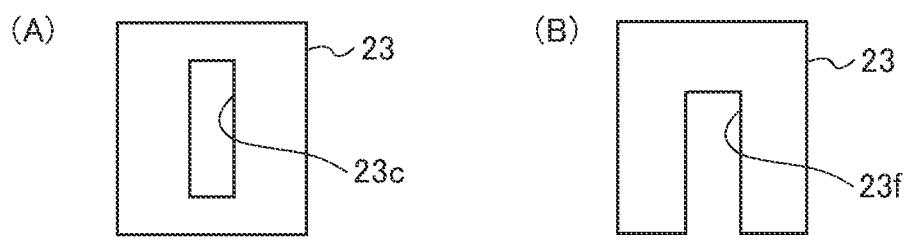
FIG. 18(A) shows an example of the shape of a hole portion provided in an auxiliary member of the lid member included in the double opening storage device of the present embodiment.
FIG. 18(B) shows an example of the shape of a groove portion provided in an auxiliary member of the lid member included in the double opening storage device of the present embodiment.

As shown in FIG. 15 and FIG. 17, the formed urethane material 23 of the lid member 20 has a positioning groove 23a, a positioning boss 23b, and a hole portion 23c or a groove portion 23f. The positioning groove 23a is provided on the top surface of the formed urethane material 23 and is a recess where the sheet portion 93 is to be fitted and placed. The positioning groove 23a is formed so as to correspond to the shape and the size of the sheet portion 93.

Figure 19:
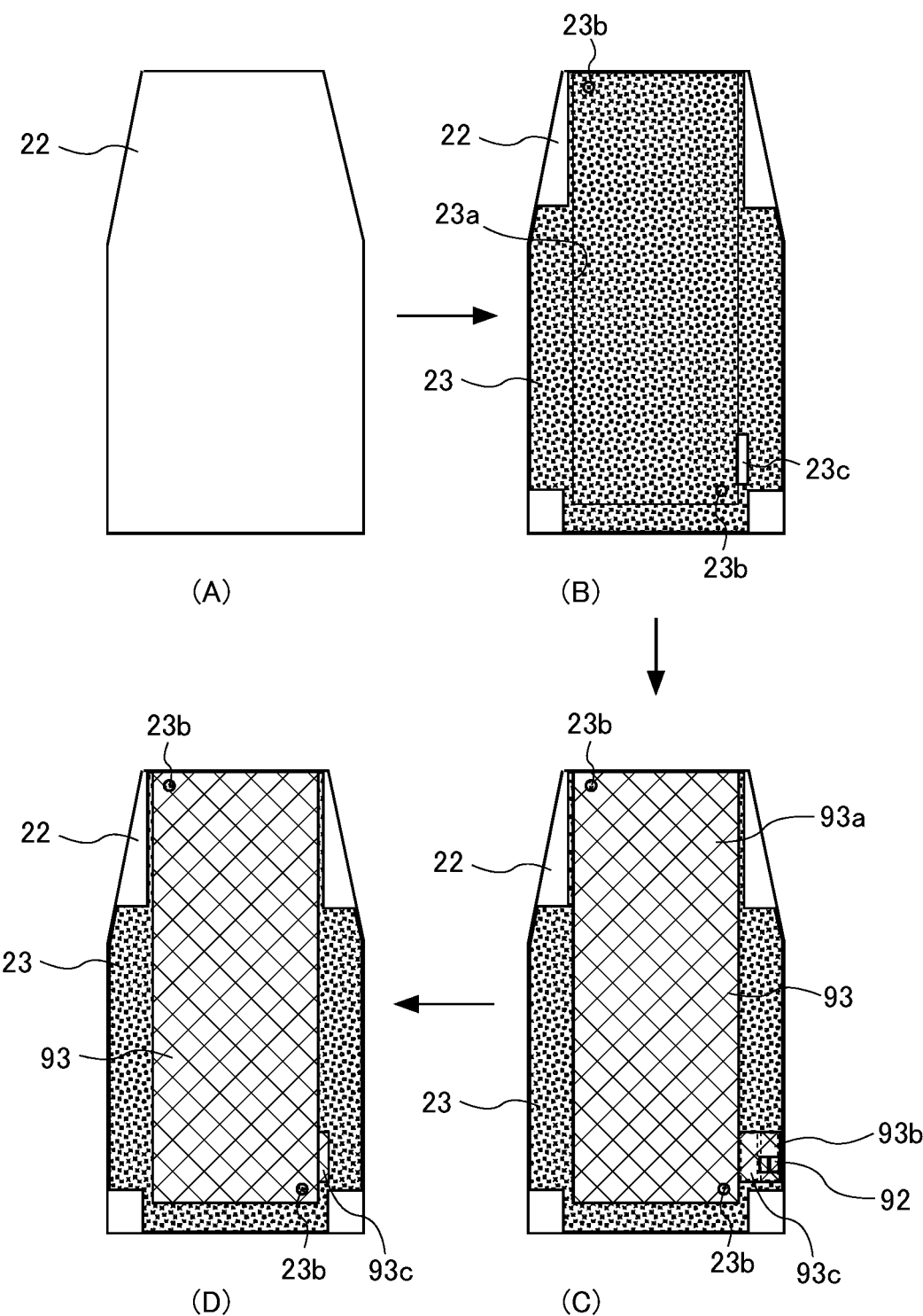
FIG. 19(A) illustrates a step in a manufacturing procedure for the lid member included in the double opening storage device of the present embodiment in which outer lid material is set on a jig.
FIG. 19(B) illustrates a step in the manufacturing process in which formed urethane material is placed on the outer lid material.
FIG. 19(C) illustrates a step in the manufacturing process in which a sheet portion of an actuation device is placed on the formed urethane material.
FIG. 19(D) illustrates a step in the manufacturing process in which a control area portion and a fitting area portion of the sheet portion are inserted into a hole portion or groove portion of the formed urethane material.

The positioning boss 23b is a part that assists movement restriction of the sheet portion 93 placed at the positioning groove 23a. The positioning boss 23b protrudes in a pin shape from the top surface of the formed urethane material 23, i.e., the bottom surface of the positioning groove 23a. The positioning boss 23b is inserted into a boss hole provided in the sheet portion 93. Preferably, positioning bosses 23b are provided at a plurality of positions away from each other on the sheet portion 93 (e.g., at opposite ends as shown in FIG. 19), in order to suppress positional displacement of the sheet portion 93.

The formed urethane material 23 includes a hole portion 23c or a groove portion 23f. The hole portion 23c is a slit-shaped hole to which a part of the sheet portion 93 is fitted. The hole portion 23c is a hole penetrating between the top and back sides of the formed urethane material 23 as shown in FIG. 18(A). The groove portion 23f is a slit-shaped groove to which a part of the sheet portion 93 is fitted. The groove portion 23f is a groove formed in a recess shape at the peripheral edge of the formed urethane material 23 as shown in FIG. 18(B). The hole portion 23c or the groove portion 23f has a top-surface opening 23d formed at the top surface of the formed urethane material 23 and a back-surface opening 23e formed at the back surface of the formed urethane material 23. The shape of the hole portion 23c or the groove portion 23f is a rectangle, a circle, an ellipse, or the like.

The hole portion 23c or the groove portion 23f may have any size and width that allow the control portion 92 attached on the sheet portion 93 to pass through from the top surface side to the back surface side of the formed urethane material 23, and preferably, the size and width of the hole portion 23c or the groove portion 23f are as small as possible without impairing a favorable tactile feeling of the vehicle occupant about the lid member 20 based on the presence of the formed urethane material 23. For example, the width of the hole portion 23c or the groove portion 23f is not greater than 15 mm.

A gap space 25 is formed between the back surface of the formed urethane material 23 and the top surface of the outer lid material 22. The gap space 25 is provided at a position communicating with the hole portion 23c or the groove portion 23f via the back-surface opening 23e. The gap space 25 is formed in such a size that accommodates the control portion 92 attached on the sheet portion 93. The gap space 25 is provided, in the lid member 20, on the one longitudinal-direction end side of the hinge member 32 where the lid member 20 is always supported (i.e., the first rotation shaft side). In the gap space 25, the control portion 92 attached on the sheet portion 93 is stored and placed.

Figure 16:
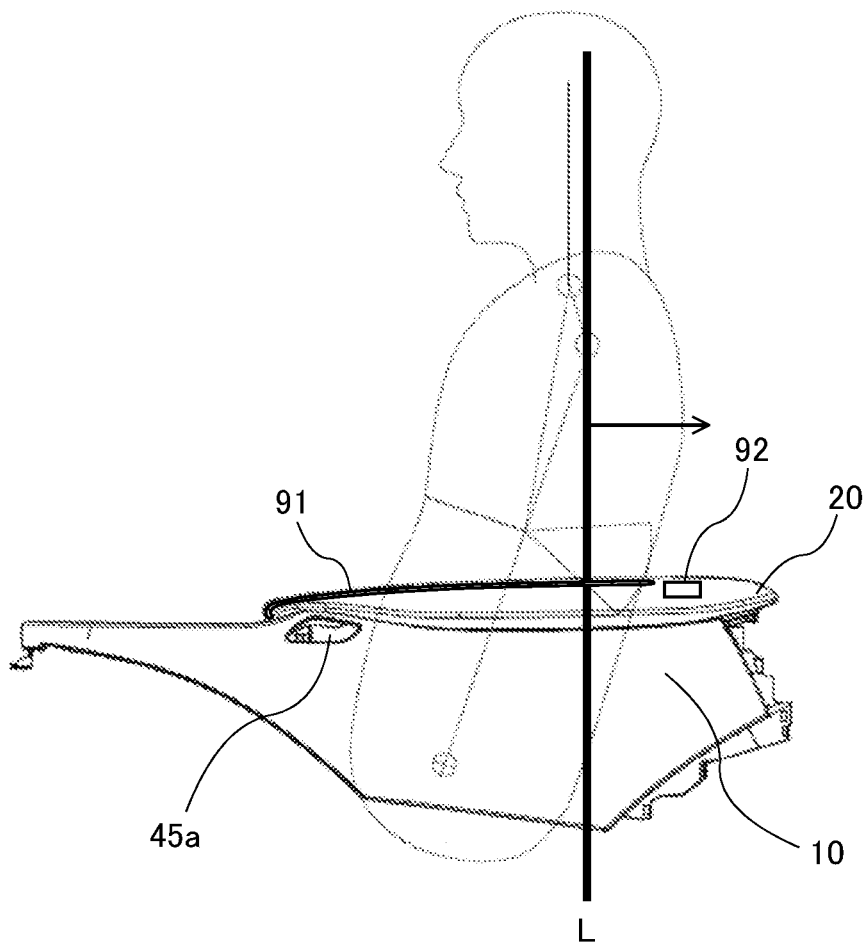
FIG. 16 illustrates a vehicle front-rear direction position where a control portion of the actuation device provided to the lid member included in the double opening storage device of the present embodiment is mounted.

The gap space 25 and therefore the control portion 92 are provided at such a height position that, even when the control portion 92 is stored in the gap space 25, the tactile feeling perceived by the vehicle occupant from the formed urethane material 23 present above the gap space 25 is not impaired. That is, the thickness of the formed urethane material 23 present above the gap space 25 is set so as not to impair the tactile feeling perceived by the vehicle occupant. Preferably, the gap space 25 and therefore the control portion 92 are, as shown in FIG. 16, provided rearward of a shoulder portion (line L shown in FIG. 16) of the vehicle occupant sitting normally on a seat, or are provided rearward of an elbow position when the vehicle occupant has put a forearm on the upper surface of the lid member 20.

The sheet portion 93 of the actuation device 90 has an actuation area portion 93a, a control area portion 93b, and a fitting area portion 93c. The actuation area portion 93a is a part occupied by the area where the heating body 91 is attached. The actuation area portion 93a corresponds to substantially the entire area of the upper surface of the lid member 20 and is formed in a substantially rectangular shape. The control area portion 93b is a part occupied by the area where the control portion 92 is attached. The fitting area portion 93c is a part to be fitted to the hole portion 23c or the groove portion 23f of the formed urethane material 23. The control area portion 93b and the fitting area portion 93c are formed integrally with each other so as to protrude from the actuation area portion 93a rightward as shown in FIG. 9, and are formed in a substantially rectangular shape. The integrated size of the control area portion 93b and the fitting area portion 93c is set to such a size as to allow these portions to pass from the top surface of the formed urethane material 23 through the hole portion 23c or the groove portion 23f to the gap space 25 so that the control portion 92 is stored in the gap space 25.

The control area portion 93b is integrated with the actuation area portion 93a via the fitting area portion 93c. That is, the fitting area portion 93c is provided between the actuation area portion 93a and the control area portion 93b. At the fitting area portion 93c, the heating body 91 electrically connected to the control portion 92 at the control area portion 93b is present, but the heating body 91 at the fitting area portion 93c does not significantly contribute to heating for the top surface of the lid member 20, and serves for current conduction to the heating body 91 at the actuation area portion 93a.

The control portion 92 is provided on a deeper side than the top surface of the lid member 20, specifically, a deeper side than the top-surface opening 23d of the hole portion 23c or the groove portion 23f of the formed urethane material 23, and more specifically, provided in the gap space 25 between the back surface of the formed urethane material 23 and the top surface of the outer lid material 22, on a deeper side than the back-surface opening 23e of the hole portion 23c or the groove portion 23f. In a state in which the control portion 92 is provided in the gap space 25, the fitting area portion 93c of the sheet portion 93 is fitted to the hole portion 23c or the groove portion 23f of the formed urethane material 23.

The control portion 92 of the actuation device 90 in the lid member 20 is connected to one end of a wiring member 95 having another end connected to the power supply device provided to the box body 10. The actuation device 90 is supplied with power from the power supply device on the box body 10 side via the wiring member 95. That is, supply of power from the power supply device on the box body 10 side to the actuation device 90 on the lid member 20 side is performed via the wiring member 95. The heating body 91 of the actuation device 90 generates heat by power supplied from the power supply device on the box body 10 side via the wiring member 95.

The wiring member 95 is an electric wire connecting the power supply device on the box body 10 side and the actuation device 90. The wiring member 95 is a flexible member used in a state in which the outer periphery thereof is covered by a protection coat. A part of the wiring member 95 is wired in the hinge member 32. That is, the wiring member 95 has a hinge wiring portion 96 wired in the hinge member 32. The hinge wiring portion 96 is a part extending and wired along the hinge member 32 between the one longitudinal-direction end and the other longitudinal-direction end of the hinge member 32.

Figure 5:
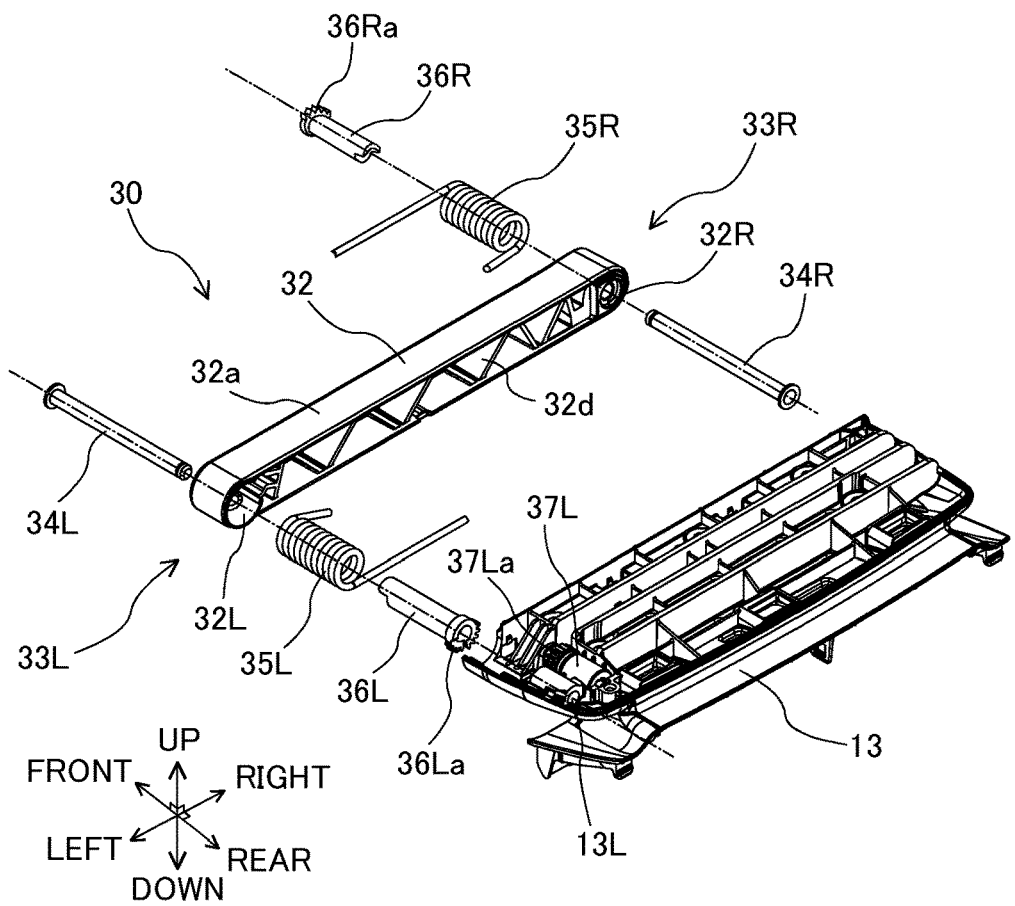
FIG. 5 is an exploded perspective view of the hinge member provided to the open/close mechanism included in the double opening storage device of the present embodiment.
Figure 10:
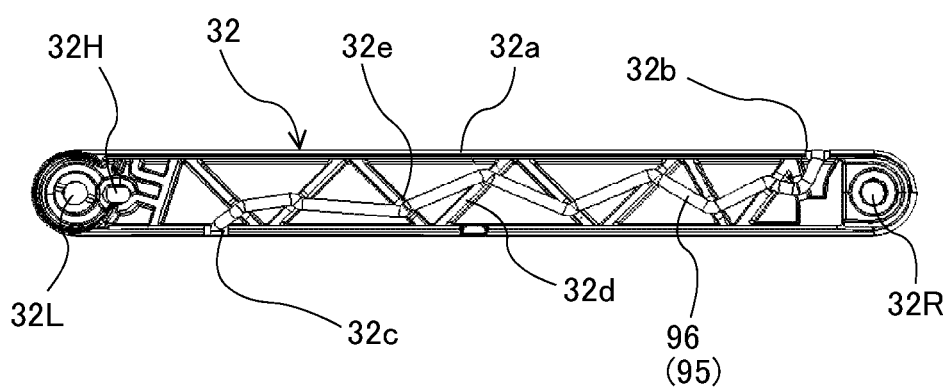
FIG. 10 is a view of the hinge member included in the double opening storage device of the present embodiment as seen from the rear side.

As shown in FIG. 5 and FIG. 10, the hinge member 32 has a body portion 32a, a first wire port 32b, a second wire port 32c, ribs 32d, and wire path portions 32e. The body portion 32a is a part extending in an arm shape between the one longitudinal-direction end where the through hole 32R is provided and the other longitudinal-direction end where the through hole 32L is provided. The body portion 32a is formed such that a belt-like member having a width in the front-rear direction forms a loop shape.

The first wire port 32b is an opening through which the hinge wiring portion 96 of the wiring member 95 on the one longitudinal-direction end side of the hinge member 32 protrudes from the inside of the hinge member 32 to the outside. The first wire port 32b is formed in a quadrangular shape, a circular shape, an elliptic shape, or the like. The first wire port 32b is located near the through hole 32R forming the first rotation shaft, and is provided at the upper surface at the one longitudinal-direction end of the hinge member 32 so as to be close to the lid member 20. Preferably, the first wire port 32b is provided at a position close to the center axis of the first rotation shaft without hindering the hinge member 32 and the lid member 20 from swinging relative to each other around the first rotation shaft, in order to shorten an extra length of the wiring member 95.

The second wire port 32c is an opening through which the hinge wiring portion 96 of the wiring member 95 on the other longitudinal-direction end side of the hinge member 32 protrudes from the inside of the hinge member 32 to the outside. The second wire port 32c is formed in a quadrangular shape, a circular shape, an elliptic shape, or the like. The second wire port 32c is located near the through hole 32L forming the second rotation shaft, and is provided at the lower surface at the other longitudinal-direction end of the hinge member 32 so as to be close to the box body 10. Preferably, the second wire port 32c is provided at a position close to the center axis of the second rotation shaft without hindering the hinge member 32 and the box body 10 from swinging relative to each other around the second rotation shaft, in order to shorten an extra length of the wiring member 95. The distance from the center axis of the second rotation shaft to the position where the second wire port 32c is provided is longer than the distance from the center axis of the first rotation shaft to the position where the first wire port 32b is provided.

The ribs 32d are parts provided for purposes such as ensuring stiffness in the up-down direction and in the left-right direction. The ribs 32d are formed so as to have a width in the front-rear direction and extend in the up-down direction and the left-right direction from inner surfaces of the loop-shaped belt-like member of the body portion 32a. The ribs 32d extend in oblique directions including an up-down-direction component and a left-right-direction component between the one longitudinal-direction end and the other longitudinal-direction end of the hinge member 32, thus extending so as to wave in a triangular waveform, as shown in FIG. 10, for example.

The wire path portions 32e are parts through which the hinge wiring portion 96 passes in the ribs 32d between the first wire port 32b and the second wire port 32c in the hinge member 32. The wire path portions 32e are provided at the ribs 32d, and are grooves or holes through which the hinge wiring portion 96 passes, or nail-shaped portions on which the hinge wiring portion 96 is caught. The wire path portion 32e is provided for each rib 32d through which the hinge wiring portion 96 passes. The size of each wire path portion 32e is set to such a size that the hinge wiring portion 96 is fitted and the hinge wiring portion 96 is inhibited from moving in the wire path portion 32e when the lid member 20 is opened/closed.

The wire path portions 32e are provided at the ribs 32d so that the length of the hinge wiring portion 96 between the first wire port 32b and the second wire port 32c becomes greater than the straight distance between the first wire port 32b and the second wire port 32c (e.g., so that the hinge wiring portion 96 waves between the first wire port 32b and the second wire port 32c). The hinge wiring portion 96 is wired so as to be longer than the straight distance between the one longitudinal-direction end and the other longitudinal-direction end of the hinge member (specifically, between the first wire port 32b and the second wire port 32c). In addition, the hinge wiring portion 96 is wired so as to extend in a bent shape with an extra length while passing through the wire path portions 32e.

The wiring member 95 has a first variable wiring portion 97 and a second variable wiring portion 98. The first variable wiring portion 97 is, of the wiring member 95, mainly, a part having an extra length (i.e., looseness) for allowing opening/closing of the lid member 20 by the part deforming in accordance with the opening/closing when the lid member 20 is opened/closed around the first rotation shaft. The second variable wiring portion 98 is, of the wiring member 95, mainly, a part having an extra length (i.e., looseness) for allowing opening/closing of the lid member 20 by the part deforming in accordance with the opening/closing when the lid member 20 is opened/closed around the second rotation shaft.

The first variable wiring portion 97 is provided at a part of the wiring member 95 protruding from the first wire port 32b of the hinge member 32. The first variable wiring portion 97 is interposed between an end of the hinge wiring portion 96 on the first wire port 32b side and the control portion 92 on the lid member 20 side. In a case where the lid member 20 is opened/closed around the first rotation shaft and thus the lid member 20 swings relative to the hinge member 32 without the hinge member 32 following the lid member 20, the first variable wiring portion 97 deforms, without wire breakage, so as to follow distance change between the first wire port 32b of the hinge member 32 and the control portion 92 on the lid member 20 side.

The second variable wiring portion 98 is provided at a part of the wiring member 95 protruding from the second wire port 32c of the hinge member 32. The second variable wiring portion 98 is interposed between an end of the hinge wiring portion 96 on the second wire port 32c side and the power supply device on the box body 10 side. In a case where the lid member 20 is opened/closed around the second rotation shaft and thus the hinge member 32 swings relative to the box body 10 so as to follow the lid member 20, the second variable wiring portion 98 deforms, without wire breakage, so as to follow distance change between the second wire port 32c of the hinge member 32 and the power supply device on the box body 10 side.

As described above, the distance from the center axis of the second rotation shaft to the position where the second wire port 32c is provided is longer than the distance from the center axis of the first rotation shaft to the position where the first wire port 32b is provided. Therefore, a deformation amount by which the second variable wiring portion 98 deforms when the lid member 20 is opened/closed around the second rotation shaft (see FIG. 11 and FIG. 13) is greater than a deformation amount by which the first variable wiring portion 97 deforms when the lid member 20 is opened/closed around the first rotation shaft (see FIG. 11 and FIG. 12).

Each of the first variable wiring portion 97 and the second variable wiring portion 98 is a part having an extra length (i.e., looseness) for allowing opening/closing of the lid member 20 in accordance with the above deformation amount. The extra length of the first variable wiring portion 97 is set in accordance with distance change of the wiring member 95 from the first wire port 32b to a wire port of the lid member 20 when the lid member 20 is opened/closed on the left side. The extra length of the second variable wiring portion 98 is set in accordance with distance change of the wiring member 95 from the second wire port 32c to a wire port of the box body 10 when the lid member 20 is opened/closed on the right side. The extra length of the second variable wiring portion 98 is greater than the extra length of the first variable wiring portion 97.

As described above, in the double opening storage device 1, the wiring member 95 connecting the power supply device on the box body 10 side and the actuation device 90 on the lid member 20 side extends and is wired along the hinge member 32 provided so as to be interposed between the box body 10 and the lid member 20. Of the wiring member 95, the hinge wiring portion 96 wired in the hinge member 32 is led out from the first wire port 32b on the one longitudinal-direction end side of the hinge member 32 where the first rotation shaft is present, leading to the actuation device 90 on the lid member 20 side, and is led out from the second wire port 32c on the other longitudinal-direction end side of the hinge member 32 where the second rotation shaft is present, leading to the power supply device on the box body 10 side.

As shown in FIG. 12, at the time of left-side opening/closing operation in which the lid member 20 rotates around the first rotation shaft, the hinge member 32 stays on the box body 10 side without following the lid member 20. On the other hand, as shown in FIG. 13, at the time of right-side opening/closing operation in which the lid member 20 rotates around the second rotation shaft, the hinge member 32 swings relative to the box body 10 so as to follow the lid member 20.

Therefore, with the structure in which the wiring member 95 is wired along the hinge member 32 as described above, the wiring member 95 is appropriately drawn between the power supply device on the box body 10 side and the actuation device 90 on the lid member 20 side without wire breakage, both when the lid member 20 is opened/closed on the left side around the first rotation shaft and when the lid member 20 is opened/closed on the right side around the second rotation shaft. That is, with the structure of the double opening storage device 1, the lid member 20 is configured to be openable/closable around each of the first rotation shaft and the second rotation shaft, and wiring of the wiring member 95 connected to the actuation device 90 provided to the lid member 20 is established.

At one end of the hinge wiring portion 96 wired along the hinge member 32, the wiring member 95 is led out from the inside of the hinge member 32 to the outside via the first wire port 32b, to be connected to the actuation device 90 on the lid member 20 side, and at the other end of the hinge wiring portion 96, the wiring member 95 is led out from the inside of the hinge member 32 to the outside via the second wire port 32c, to be connected to the power supply device on the box body 10 side. Thus, an extra length needed for establishing wiring of the wiring member 95 even when the lid member 20 is opened/closed becomes as short as possible, and ease of establishment of wiring of the wiring member 95 is ensured.

The inside of the storage portion 12 of the box body 10 is easily viewable from the left side in the vehicle compartment (i.e., the passenger seat in a case of a right-hand drive car) when the lid member 20 is opened/closed on the left side around the first rotation shaft, and meanwhile, the inside of the storage portion 12 is easily viewable from the right side in the vehicle compartment (i.e., the driver seat in a case of a right-hand drive car) when the lid member 20 is opened/closed on the right side around the second rotation shaft. As described above, the extra length of the second variable wiring portion 98 is greater than the extra length of the first variable wiring portion 97. The deformation amount of the second variable wiring portion 98 when the lid member 20 is opened/closed on the right side around the second rotation shaft is greater than the deformation amount of the first variable wiring portion 97 when the lid member 20 is opened/closed on the left side around the first rotation shaft.

Thus, in the case of a right-hand drive car, the second variable wiring portion 98 having a greater extra length than the first variable wiring portion 97 is easily viewable from the driver seat side and is hardly viewable from the passenger seat side. Therefore, in the case of a right-hand drive car, the second variable wiring portion 98 having the greater extra length is hardly viewable from a person sitting on the passenger seat, so that the visual appearance as seen from the passenger seat side is improved and an unpleasant feeling when the person on the passenger seat side views the wiring member 95 is reduced. In order to improve the visual appearance as seen from both of the driver seat side and the passenger seat side, a braided tube or the like is suitably applied to a visible exposed part of the wiring member 95.

The wiring member 95 has the first variable wiring portion 97 that deforms in accordance with left-side opening/closing of the lid member 20 around the first rotation shaft, and the second variable wiring portion 98 that deforms in accordance with right-side opening/closing of the lid member 20 around the second rotation shaft. The first variable wiring portion 97 is interposed between an end of the hinge wiring portion 96 on the one longitudinal-direction end side of the hinge member 32 and the actuation device 90 on the lid member 20 side. The second variable wiring portion 98 is interposed between an end of the hinge wiring portion 96 on the other longitudinal-direction end side of the hinge member 32 and the power supply device on the box body 10 side. The first variable wiring portion 97 has an extra length for allowing left-side opening/closing of the lid member 20. The second variable wiring portion 98 has an extra length for allowing right-side opening/closing of the lid member 20. Therefore, left-side opening/closing and right-side opening/closing of the lid member are smoothly performed.

Between the one longitudinal-direction end (specifically, the first wire port 32b) and the other longitudinal-direction end (specifically, the second wire port 32c) of the hinge member 32, the hinge wiring portion 96 is wired so as to be longer than the straight distance between the first wire port 32b and the second wire port 32c. Further, the hinge wiring portion 96 is wired so as to bend with an extra length while passing through the wire path portions 32e. Therefore, even when the hinge wiring portion 96 is pulled to the lid member 20 side or the box body 10 side when the lid member 20 is opened/closed, the hinge wiring portion 96 is extended/contracted, whereby wire breakage of the wiring member 95 is prevented when the lid member 20 is opened/closed.

In the double opening storage device 1, the actuation device 90 is provided inside the lid member 20, the heating body 91 is provided in the vicinity of the top surface of the lid member 20, and the heating body 91 generates heat through supply of power from the power supply device on the box body 10 side via the wiring member 95, whereby the top surface of the lid member 20 is warmed.

The control portion 92 is harder than the heating body 91 and is harder than the formed urethane material 23. Therefore, if the control portion 92 is provided in the vicinity of the top surface of the lid member 20 (e.g., on the top surface side of the formed urethane material 23), a tactile feeling perceived by the vehicle occupant putting a forearm on the upper surface of the lid member 20 is impaired.

In this regard, in the double opening storage device 1, the heating body 91 of the actuation device 90 is provided in the vicinity of the top surface of the lid member 20, and the control portion 92 for controlling heat generation of the heating body 91 is provided on a deeper side than the top-surface opening 23d of the hole portion 23c or the groove portion 23f of the formed urethane material 23, specifically, provided in the gap space 25 between the back surface of the formed urethane material 23 and the top surface of the outer lid material 22, on a deeper side than the back-surface opening 23e of the hole portion 23c or the groove portion 23f.

In this structure, the control portion 92 is not exposed on the top surface side of the formed urethane material 23 so that a step due to presence of the control portion 92 is not formed on the top surface side of the formed urethane material 23, and the control portion 92 is not located just under the back surface of the skin material 24. Therefore, when the vehicle occupant puts a forearm on the upper surface of the lid member 20, even if the forearm is positioned above the control portion 92, a tactile feeling perceived by the vehicle occupant is prevented from being impaired by the control portion 92, and the visual appearance of the lid member 20 is prevented from being deteriorated due to a step on the top surface side of the formed urethane material 23.

In particular, in the above structure, the formed urethane material 23 is present above the control portion 92. Therefore, when the vehicle occupant puts a forearm on the upper surface of the lid member 20, even if the forearm is positioned above the control portion 92, a tactile feeling perceived by the vehicle occupant is improved owing to cushion property of the formed urethane material 23.

Thus, in the double opening storage device 1, actuation (specifically, a heater function) of the actuation device 90 is ensured by providing, inside the lid member 20, the actuation device 90 including the control portion 92, and a tactile feeling perceived by the vehicle occupant when the lid member 20 is used as an arm rest is favorably ensured.

Next, a manufacturing procedure for the double opening storage device 1 will be described.

First, components of the lid member 20 (specifically, the inner lid material 21, the outer lid material 22, the formed urethane material 23, and the skin material 24) are prepared, and the sheet portion 93 to which the heating body 91 and the control portion 92 are attached as the actuation device 90, and the box body 10 are prepared. Next, as shown in FIG. 19(A), the outer lid material 22 is set on a jig, and as shown in FIG. 19(B), the formed urethane material 23 is placed on the top surface of the outer lid material 22.

Then, as shown in FIG. 19(C), the sheet portion 93 (specifically, the actuation area portion 93a) of the actuation device 90 is placed on the top surface of the formed urethane material 23, while being positioned using the positioning groove 23a and the positioning bosses 23b. Thereafter, as shown in FIG. 19(D), the control area portion 93b and the fitting area portion 93c of the sheet portion 93 are inserted into the hole portion 23c or the groove portion 23f from the top-surface opening 23d of the formed urethane material 23, and the control area portion 93b is caused to protrude from the back-surface opening 23e of the formed urethane material 23, so as to be placed at a position where the gap space 25 is formed, thus manufacturing a lid intermediate body.

Next, the lid intermediate body is detached from the jig, and with the wiring member 95 fixed to a rib and/or a nail portion formed on the back surface of the outer lid material 22 of the lid intermediate body, the skin material 24 is wound over the lid intermediate body and is fixed by a tacker or welding. Then, with fixation of the wiring member 95 released, the inner lid material 21 is attached to the outer lid material 22 of the lid intermediate body, thus manufacturing the lid member 20. After the lid member 20 is manufactured, the wiring member 95 is wired through the hinge member 32. Then, the lid member 20 is attached to the box body 10 and the wiring member 95 is wired on the box body 10 side.

With the above procedure, an assembly of the lid member 20 in which the heating body 91 is provided on the top surface side of the formed urethane material 23 and the control portion 92 is provided on the back surface side of the formed urethane material 23, is manufactured, and the double opening storage device 1 in which the assembled lid member 20 is attached to the box body 10 is manufactured.

In the above embodiment, each of the first variable wiring portion 97 and the second variable wiring portion 98 corresponds to a "variable wiring portion" described in the claims.

In the above embodiment, an integrated body of the inner lid material 21 and the outer lid material 22, or the outer lid material 22 corresponds to a "base material" described in the claims, the formed urethane material 23 corresponds to an "auxiliary member" described in the claims, and each of the positioning groove 23a and the positioning boss 23b corresponds to a "positioning portion" described in the claims.

In the above embodiment, the wiring member 95 is flexible, and the first variable wiring portion 97 and the second variable wiring portion 98 have extra lengths for allowing opening/closing of the lid member 20. However, the present invention is not limited thereto. The first variable wiring portion 97 and the second variable wiring portion 98 may be extendable/contractible in length so as to allow opening/closing of the lid member 20.

In the above embodiment, under the assumption that the wiring member 95 has the hinge wiring portion 96 wired along the hinge member 32, the first variable wiring portion 97 interposed between one end of the hinge wiring portion 96 and the actuation device 90 on the lid member 20 side, and the second variable wiring portion 98 interposed between the other end of the hinge wiring portion 96 and the power supply device on the box body 10 side, the hinge wiring portion 96 and the first variable wiring portion 97 are portions separate from each other, and the hinge wiring portion 96 and the second variable wiring portion 98 are portions separate from each other. However, the present invention is not limited thereto. The hinge wiring portion 96 and the first variable wiring portion 97 may overlap each other, i.e., at least a part of the first variable wiring portion 97 may be stored in the hinge member 32, and the hinge wiring portion 96 and the second variable wiring portion 98 may overlap each other, i.e., at least a part of the second variable wiring portion 98 may be stored in the hinge member 32.

In the above embodiment, the actuation device 90 is a heater actuated through supply of power. However, the present invention is not limited thereto. The actuation device 90 may be a cooler, a lighting device, or the like actuated through supply of power. The actuation device 90 may be actuated through supply of fluid such as water or air, instead of supply of power. In a case where the actuation device 90 is actuated through supply of fluid, the wiring member 95 is a tubular member through which the fluid flows. Then, at least the first variable wiring portion 97 and the second variable wiring portion 98 of the wiring member 95 as the tubular member are formed to be deformable (e.g., in a flexible tube form or bellows form so as to be extendable/contractible in length).

In the above embodiment, when the lid member 20 is opened/closed on the left side around the first rotation shaft, the hinge member 32 stays on the box body 10 side without following the lid member 20, and when the lid member 20 is opened/closed on the right side around the second rotation shaft, the hinge member 32 swings relative to the box body 10 so as to follow the lid member 20. However, the present invention is not limited thereto. Conversely, when the lid member 20 is opened/closed on the left side around the first rotation shaft, the hinge member 32 may swing relative to the box body 10 so as to follow the lid member 20, and when the lid member 20 is opened/closed on the right side around the second rotation shaft, the hinge member 32 may stay on the box body 10 side without following the lid member 20.

In the above embodiment, the hinge member 32 is provided on the rear side of the box body 10. However, the present invention is not limited thereto. The hinge member 32 may be provided on the front side of the box body 10. Further, without limitation to the case where the double opening storage device 1 has a structure in which the hinge member 32 is provided only on the rear side of the box body 10, the hinge members 32 may be provided on both of the rear and front sides of the box body 10.

Figure 20:
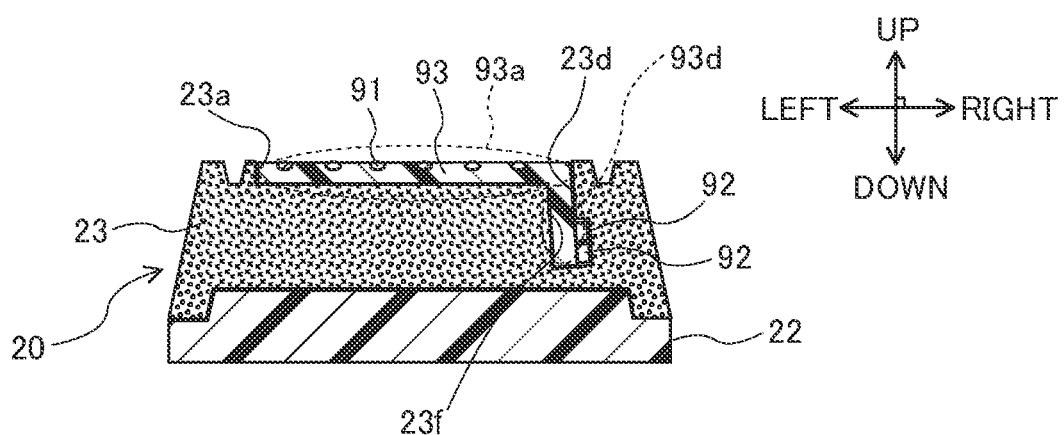
FIG. 20 is a sectional view of a specific part of the actuation device provided to the lid member included in the double opening storage device according to a modification, taken along a vertical plane extending in the vehicle left-right direction, as seen from the rear of the vehicle.

In the above embodiment, the control portion 92 of the actuation device 90 is provided on a deeper side than the back-surface opening 23e of the hole portion 23c or the groove portion 23f of the formed urethane material 23, specifically, provided in the gap space 25 between the back surface of the formed urethane material 23 and the top surface of the outer lid material 22. However, the present invention is not limited thereto. As shown in FIG. 20, the control portion 92 of the actuation device 90 may be provided in the hole portion 23c or the groove portion 23f of the formed urethane material 23 so as to be fitted to the hole portion 23c or the groove portion 23f. In this case, the sheet portion 93 of the actuation device 90 may have the actuation area portion 93a to which the heating body 91 is attached, and a control area portion 93d to which the control portion 92 is attached, the control area portion 93d being fitted to the hole portion 23c or the groove portion 23f.

Also in such a modification, the control portion 92 is not exposed on the top surface side of the formed urethane material 23 so that a step due to presence of the control portion 92 is not formed on the top surface side of the formed urethane material 23, and the control portion 92 is not located just under the back surface of the skin material 24. Thus, actuation (specifically, a heater function) of the actuation device 90 is ensured by providing, inside the lid member 20, the actuation device 90 including the control portion 92, and a tactile feeling perceived by the vehicle occupant when the lid member 20 is used as an arm rest is favorably ensured.

In this modification, as in the above embodiment, the hole portion 23c may be a hole that penetrates between the top and back sides of the formed urethane material 23 and has openings on the top and back sides (i.e., the top-surface opening 23d and the back-surface opening 23e), or the groove portion 23f may be a groove that is formed in a recess shape at the peripheral edge of the formed urethane material 23, and has openings on the top and back sides (i.e., the top-surface opening 23d and the back-surface opening 23e). Alternatively, as shown in FIG. 20, the groove portion 23f may be a groove that has an opening (i.e., the top-surface opening 23d) at the top surface of the formed urethane material 23 and has no opening at the back surface of the formed urethane material 23.

In the above embodiment, the actuation device 90 is a heater actuated through supply of power. However, the present invention is not limited thereto. The actuation device 90 may be a device having a control portion for performing actuation control for a cooler or a lighting device actuated through supply of power, or the like.

In the above embodiment, the double opening storage device 1 is vehicular interior equipment including the box body 10, the lid member 20 usable as an arm rest and covering the opening 11 provided at the upper surface of the box body 10 in an openable/closable manner, and the actuation device 90 provided inside the lid member 20. The actuation device 90 has the heating body 91 for generating heat through supply of power from the power supply device on the box body 10 side, and the control portion 92 for performing various kinds of control such as temperature adjustment for the heating body 91. The heating body 91 is provided over substantially the entire area of the upper surface of the lid member 20. Thus, a forearm of the vehicle occupant put on the upper surface of the lid member 20 is warmed using the heating body 91.

The control portion 92, which includes a thermistor and a thermostat enclosed by a case and used for temperature adjustment, and the like, is provided near the heating body 91 in the lid member 20 and is harder than the heating body 91. Therefore, if the control portion 92 is provided in the vicinity of the top surface of the lid member 20, a tactile feeling perceived by the vehicle occupant about the lid member 20 when a forearm of the vehicle occupant is put on the upper surface of the lid member 20, is impaired. Accordingly, the control portion 92 is provided on a deeper side than the top surface of the lid member 20. Thus, actuation (specifically, a heater function) of the actuation device 90 is ensured by providing, inside the lid member 20, the actuation device 90 including the control portion 92, and a tactile feeling perceived by the vehicle occupant when the lid member 20 is used as an arm rest is favorably ensured.

In the above description, the actuation device 90 is a heater device for warming the top surface of the lid member 20 of the double opening storage device 1, and the control portion 92 of the actuation device 90 is provided at the lid member 20 of the double opening storage device 1, specifically, provided on a deeper side than the top surface of the lid member 20. However, the above-described arrangement structure for the control portion 92 may be applied to not only the double opening storage device in which the lid member 20 to be contacted with the vehicle occupant is opened around, selectively, one of the first rotation shaft and the second rotation shaft, but also a single opening storage device in which the lid member 20 to be contacted with the vehicle occupant is opened around a single rotation shaft, and further, may be applied to vehicular interior equipment such as a vehicular seat or a door inner wall to be contacted with the vehicle occupant.

That is, a first aspect may be directed to vehicular interior equipment to be contacted with a vehicle occupant, the vehicular interior equipment including:
 a plate-shaped base material;
 an auxiliary member provided on a top surface side of the base material; and
 an actuation device having an actuation portion to be actuated through supply of power, and a control portion electrically connected to the actuation portion and configured to control actuation of the actuation portion, wherein
 the auxiliary member has a a hole portion or a groove portion having openings respectively at top and back surfaces thereof or having an opening at the top surface and no opening at the back surface, the actuation portion is provided on the top surface side of the auxiliary member, and the control portion is provided on a deeper side than the opening on the top surface side of the hole/groove portion.

In a second aspect based on the vehicular interior equipment of the first aspect, the control portion may be provided in a gap space formed between the back surface of the auxiliary member and the top surface of the base material, on a deeper side than the opening on the back surface side of the hole portion or the groove portion.

In a third aspect based on the vehicular interior equipment of the second aspect, the actuation device may have a sheet portion to which the actuation portion and the control portion are attached, the sheet portion being formed in a sheet shape, and the sheet portion may have an actuation area portion to which the actuation portion is attached, a control area portion to which the control portion is attached, and a fitting area portion provided between the actuation area portion and the control area portion and fitted to the hole portion or the groove portion.

In a fourth aspect based on the vehicular interior equipment of the first aspect, the control portion may be provided in the hole portion or the groove portion.

In a fifth aspect based on the vehicular interior equipment of the fourth aspect, the actuation device may have a sheet portion to which the actuation portion and the control portion are attached, the sheet portion being formed in a sheet shape, and the sheet portion may have an actuation area portion to which the actuation portion is attached, and a control area portion to which the control portion is attached, the control area portion being fitted to the hole portion or the groove portion.

In a sixth aspect based on the vehicular interior equipment of the third or fifth aspect, the auxiliary member may have a positioning portion provided to the top surface thereof on which the actuation area portion is placed, the positioning portion positioning the sheet portion.

In a seventh aspect based on the vehicular interior equipment of any one of the first to sixth aspects, the vehicular interior equipment may further include a skin member covering the top surface of the auxiliary member.

In an eighth aspect based on the vehicular interior equipment of any one of the first to seventh aspects, the actuation device may be a heater element configured to warm a top surface of the vehicular interior equipment.

In a ninth aspect based on the vehicular interior equipment of the eighth aspect, the control portion may include at least one of a thermistor and a thermostat.

With the configurations of the above aspects, while the actuation portion is provided on the top surface side of the auxiliary member, the control portion is not exposed on the top surface side of the auxiliary member, and a step due to presence of the control portion is not formed on the top surface side of the auxiliary member. Therefore, even if the vehicle occupant contacts the top surface of the vehicular interior equipment, a tactile feeling perceived by the vehicle occupant is prevented from being impaired by the control portion. Thus, the function of the actuation device is ensured by providing, inside the vehicular interior equipment, the actuation device including the control portion, and a tactile feeling perceived by the vehicle occupant is favorably ensured.

The present invention is not limited to the embodiment and the modification described above, and various changes may be made without departing from the gist of the present invention.

This application claims priority on Japanese Patent Application No. 2021-056302 filed in Japan on Mar. 29, 2021 and priority on Japanese Patent Application No. 2021-060177 filed in Japan on Mar. 31, 2021, the entire contents of which are incorporated herein by reference.

The invention claimed is:

1. A double opening storage device comprising:
a box body having a storage portion having an opening;
a lid member covering the opening in an openable/closable manner;
an open/close mechanism configured to open/close the lid member around, selectively, one of a first rotation shaft and a second rotation shaft; and
an actuation device provided at the lid member and supplied with power or fluid from a box body side via a wiring member, wherein
the open/close mechanism has a hinge member provided so as to be interposed between the box body and the lid member, the hinge member having one end supported swingably around the first rotation shaft by the lid member and an other end supported swingably around the second rotation shaft by the box body,
when the lid member is opened/closed around the first rotation shaft, the hinge member stays on the box body side without following the lid member, and when the lid member is opened/closed around the second rotation shaft, the hinge member swings relative to the box body so as to follow the lid member, and
the wiring member has a hinge wiring portion extending and wired along the hinge member between the one end and the other end.

2. The double opening storage device according to claim 1, wherein
the hinge wiring portion is wired so as to be longer than a straight distance between the one end and the other end of the hinge member.

3. The double opening storage device according to claim 1, wherein
the wiring member has a variable wiring portion interposed between an end of the hinge wiring portion and the lid member side or the box body side, the variable wiring portion being deformable in accordance with opening/closing of the lid member around the first rotation shaft or the second rotation shaft.

4. The double opening storage device according to claim 3, wherein
the variable wiring portion is a part having an extra length for allowing opening/closing of the lid member.

5. The double opening storage device according to claim 3, wherein
the variable wiring portion is a part extendable/contractible in length so as to allow opening/closing of the lid member.

6. The double opening storage device according to claim 1, wherein
the lid member has a plate-shaped base material and an auxiliary member provided on a top surface side of the base material, and is a member to be contacted with a vehicle occupant,
the actuation device has an actuation portion to be actuated through supply of power, and a control portion electrically connected to the actuation portion and configured to control actuation of the actuation portion,
the auxiliary member has one of a hole portion or a groove portion having openings respectively at top and back surfaces thereof or having an opening at the top surface and no opening at the back surface, the actuation portion is provided on the top surface side of the auxiliary member, and the control portion is provided on a deeper side than the opening on the top surface side of the one of the hole portion or the groove portion.

7. The double opening storage device according to claim 6, wherein the control portion is provided in a gap space formed between the back surface of the auxiliary member and the top surface of the base material, on a deeper side than the opening on the back surface side of the one of the hole portion or the groove portion.

8. The double opening storage device according to claim 7, wherein the actuation device has a sheet portion to which the actuation portion and the control portion are attached, the sheet portion being formed in a sheet shape, and the sheet portion has an actuation area portion to which the actuation portion is attached, a control area portion to which the control portion is attached, and a fitting area portion provided between the actuation area portion and the control area portion and fitted to the one of the hole portion or the groove portion.

9. The double opening storage device according to claim 8, wherein the auxiliary member has a positioning portion provided to the top surface thereof on which the actuation area portion is placed, the positioning portion positioning the sheet portion.

10. The double opening storage device according to claim 6, wherein the control portion is provided in the one of the hole portion or the groove portion.

11. The double opening storage device according to claim 10, wherein the actuation device has a sheet portion to which the actuation portion and the control portion are attached, the sheet portion being formed in a sheet shape, and the sheet portion has an actuation area portion to which the actuation portion is attached, and a control area portion to which the control portion is attached, the control area portion being fitted to the one of the hole portion or the groove portion.

12. The double opening storage device according to claim 11, wherein the auxiliary member has a positioning portion provided to the top surface thereof on which the actuation area portion is placed, the positioning portion positioning the sheet portion.

13. The double opening storage device according to claim 6, further comprising a skin member covering the top surface of the auxiliary member.

14. The double opening storage device according to claim 6, wherein the actuation device is a heater device configured to warm a top surface of the lid member.

15. The double opening storage device according to claim 14, wherein the control portion includes at least one of a thermistor and a thermostat.

* * * * *